US009952529B2

(12) United States Patent
Taniwaki et al.

(10) Patent No.: US 9,952,529 B2
(45) Date of Patent: Apr. 24, 2018

(54) PRINT HEAD AND IMAGE FORMING APPARATUS

(71) Applicant: FUJI XEROX CO., LTD., Tokyo (JP)

(72) Inventors: Michio Taniwaki, Kanagawa (JP); Kenichi Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 15/350,192

(22) Filed: Nov. 14, 2016

(65) Prior Publication Data
US 2017/0371267 A1 Dec. 28, 2017

(30) Foreign Application Priority Data

Jun. 23, 2016 (JP) .................................. 2016-124137

(51) Int. Cl.
*G03G 15/043* (2006.01)
*H04N 1/29* (2006.01)
*H04N 1/23* (2006.01)
*H04N 1/00* (2006.01)
*G06K 15/12* (2006.01)

(52) U.S. Cl.
CPC ....... *G03G 15/043* (2013.01); *G06K 15/1214* (2013.01); *H04N 1/00978* (2013.01); *H04N 1/2346* (2013.01); *H04N 1/29* (2013.01); *H04N 2201/0082* (2013.01)

(58) Field of Classification Search
CPC ........... G03G 15/043; G03G 15/04045; G03G 15/04054; G03G 15/04063; H04N 1/2346; B41J 2/41; B41J 2/447
See application file for complete search history.

(56) References Cited

U.S. PATENT DOCUMENTS

| 2010/0225730 | A1 | 9/2010 | Taniwaki et al. |
| 2010/0245794 | A1* | 9/2010 | Taira .................... G03G 15/326 355/67 |
| 2010/0254723 | A1* | 10/2010 | Tanaka ..................... B41J 2/451 399/51 |
| 2016/0334756 | A1* | 11/2016 | Taniyama .............. G03G 21/20 |
| 2016/0349662 | A1* | 12/2016 | Tanaka ............. G03G 15/04054 |

FOREIGN PATENT DOCUMENTS

JP 2010-228437 10/2010

\* cited by examiner

*Primary Examiner* — Sandra Brase
(74) *Attorney, Agent, or Firm* — Fildes & Outland, P.C.

(57) ABSTRACT

A print head includes: a mounting board; a light source portion that includes a plurality of light emitting elements provided on one surface of the mounting board; a drive member that is provided on other surface of the mounting board so as to generate a lighting signal and drive the light source portion; and a first temperature detector that is provided on the mounting board, and at least one second temperature detector that is provided at a farther position on the mounting board from the drive member than the first temperature detector; and the drive member includes: a light emitting unit that generates the lighting signal based on a temperature detected by the first temperature detector and a temperature detected by the second temperature detector; and an optical unit that forms an image of light emitted from the light emitting unit.

10 Claims, 11 Drawing Sheets

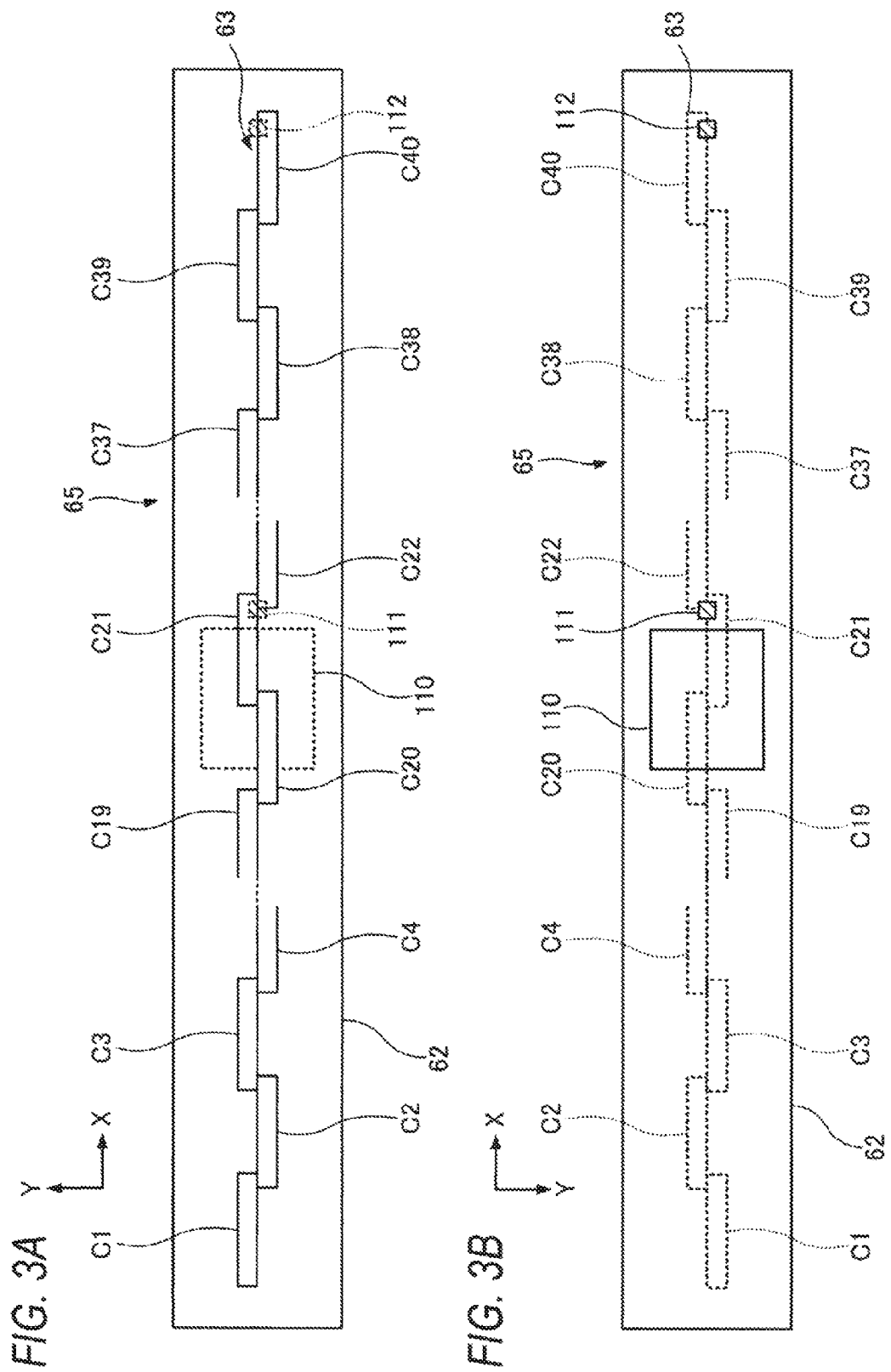

| ADDRESS | TEMPERATURE (°C) | RESISTANCE VALUE RATIO |
|---|---|---|
| Therm_LUT0 | 0 | 3424 |
| Therm_LUT1 | 5 | 3258 |
| Therm_LUT2 | 10 | 3070 |
| Therm_LUT3 | 15 | 2863 |
| Therm_LUT4 | 20 | 2641 |
| Therm_LUT5 | 25 | 2409 |
| Therm_LUT6 | 30 | 2174 |
| Therm_LUT7 | 35 | 1942 |
| Therm_LUT8 | 40 | 1720 |
| Therm_LUT9 | 45 | 1510 |
| Therm_LUT10 | 50 | 1317 |
| Therm_LUT11 | 55 | 1142 |
| Therm_LUT12 | 60 | 987 |
| Therm_LUT13 | 65 | 849 |
| Therm_LUT14 | 70 | 730 |
| Therm_LUT15 | 75 | 610 |

… image forming apparatus, 10 … image forming
PRINT HEAD AND IMAGE FORMING APPARATUS

CROSS-REFERENCE TO RELATED APPLICATIONS

This application is based on and claims priority under 35 USC 119 from Japanese Patent Application No. 2016-124137 filed on Jun. 23, 2016.

BACKGROUND

Technical Field

The present invention relates to a print head and an image forming apparatus.

SUMMARY

According to an aspect of the invention, there is provided a print head comprising: a mounting board; a light source portion that includes plural light emitting elements provided on one surface of the mounting board; a drive member that is provided on the other surface of the mounting board so as to generate a lighting signal and drive the light source portion; and a first temperature detector that is provided on the mounting board, and at least one second temperature detector that is provided at a farther position on the mounting board from the drive member than the first temperature detector; wherein the drive member includes: a light emitting unit that generates the lighting signal based on a temperature detected by the first temperature detector and a temperature detected by the second temperature detector; and an optical unit that forms an image of light emitted from the light emitting unit.

BRIEF DESCRIPTION OF THE DRAWINGS

Exemplary embodiments of the present invention will be described in detail based on the following figures, wherein:

FIGS. 3A and 3B are plan views of a light emitting device, FIG. 3A is a plan view in one surface of the light emitting device, and FIG. 3B is a plan view in the other surface of the light emitting device;

FIG. 4A shows the configuration of the light emitting chip, and FIG. 4B shows the configuration of a drive circuit of the light emitting device and the configuration of wirings (lines) on a mounting board;

FIG. 10A shows the relationship between the resistance value ratio and the temperature, and FIG. 10B shows a look-up table (LUT) stored as correction values B in a correction value B memory.

DESCRIPTION OF REFERENCE NUMERALS AND SIGNS

1 … image forming apparatus, 10 … image forming process portion, 11,11Y,11M,11C,11K … image forming unit, 12 … photoreceptor drum, 14 … print head, 30 … image forming controller, 40 … image processing portion, 62 … mounting board, 63 … light source portion, 64 … rod lens array, 65 … light emitting device, 101 … transfer portion, 102 … light emitting portion, 110 … drive circuit, 120 … transfer signal generating portion, 140 … lighting signal generating portion, 141 … serial communication portion, 142 … correction value A memory, 143 … correction value B memory, 144 … correction value computing portion, 145 … temperature measuring portion, 146 … lighting period calculating portion, 147 … lighting signal output portion, 148 … nonvolatile memory, 160 … reference potential supply portion, 170 … power supply potential supply portion, φ1 … first transfer signal, φ2 … second transfer signal, φI(φI1-φI40) … lighting signal, C(C1-C40) … light emitting chips, L … light emitting thyristor, T … transfer thyristor, Dx … coupling diode, Vga … power supply potential, Vsub … reference potential

DETAILED DESCRIPTION

In an image forming apparatus using an electrophotographic system, such as a printer, a copying machine or a facsimile machine, an image is formed in the following manner. That is, a photoreceptor which has been charged is irradiated with image information by an optical recording unit to obtain an electrostatic latent image. After that, toner is applied to the electrostatic latent image, and an image visualized thus is transferred onto recording paper and fixed thereto. As such an optical recording unit, a recording apparatus using an optical scanning system in which a laser is used for exposure with a laser beam scanning in a main scanning direction. In addition, in recent years, a recording apparatus using an LPH (LED Print Head) has been used in response to a request for miniaturization of the apparatus. In the LPH, plural light emitting elements such as LEDs (Light Emitting Diodes) are arrayed in a main scanning direction as a light source portion.

An exemplary embodiment of the invention will be described below with reference to the accompanying drawings.

(Image Forming Apparatus 1)

Figure 1:
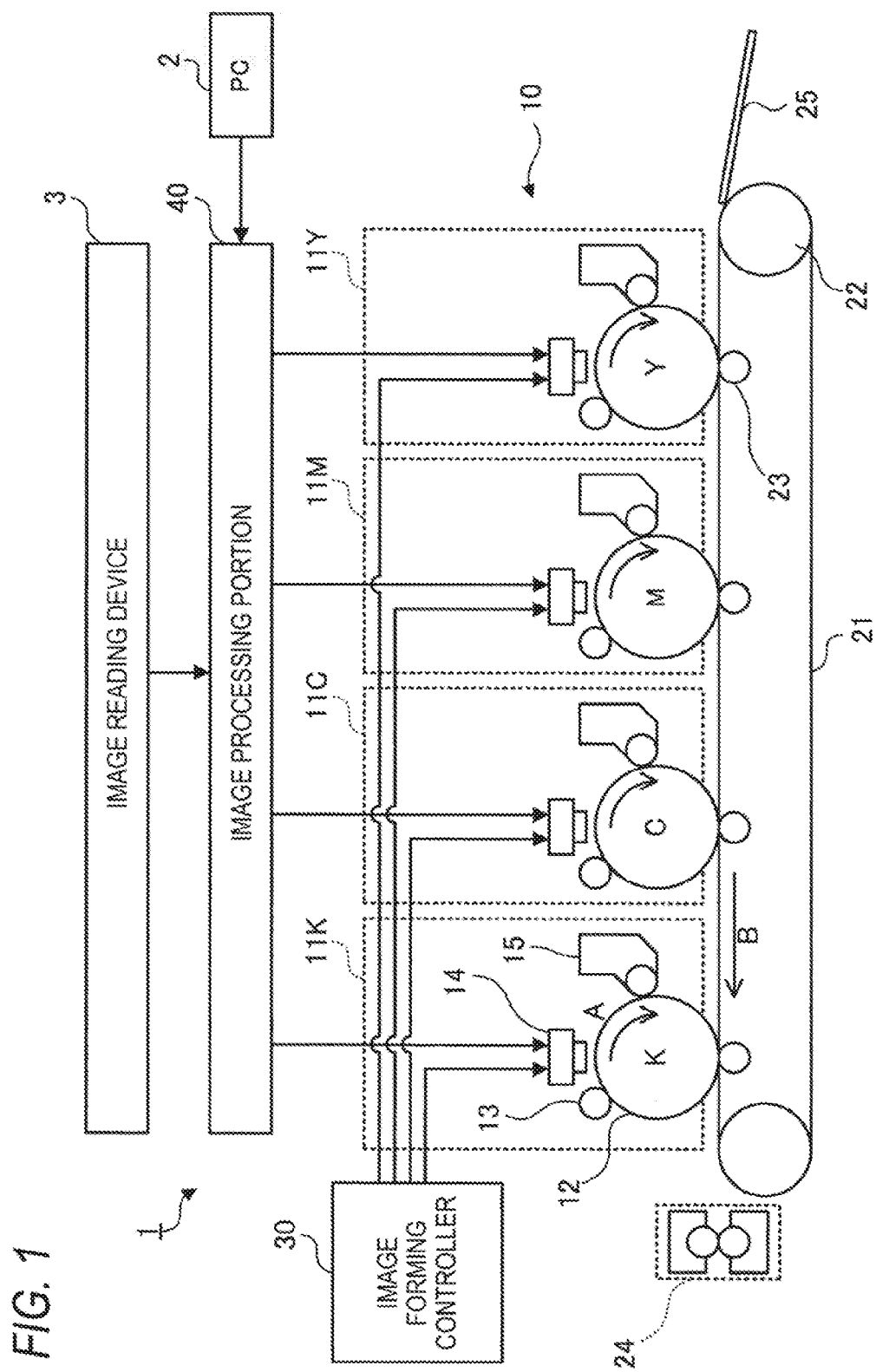
FIG. 1 is a view showing an example of the total configuration of an image forming apparatus to which an exemplary embodiment of the invention is applied.

FIG. 1 is a view showing an example of the total configuration of an image forming apparatus 1 to which the exemplary embodiment is applied. The image forming apparatus 1 shown in FIG. 1 is a so-called tandem type image forming apparatus. The image forming apparatus 1 has an image forming process portion 10, an image forming controller 30, and an image processing portion 40. In the image forming process portion 10, an image is formed in accordance with image data for each color. The image forming controller 30 controls the image forming process portion 10. The image processing portion 40 is, for example, connected to a PC (Personal Computer) 2 or an image reading apparatus 3. The image processing portion 40 performs predetermined image processing on image data received from the PC 2 or the image reading apparatus 3.

The image forming process portion 10 has four image forming units 11Y, 11M, 11C and 11K disposed in parallel and at predetermined intervals. Each image forming unit 11Y, 11M, 11C, 11K has a photoreceptor drum 12, a charger 13, a print head 14, and a developing device 15. The photoreceptor drum 12 is an example of an image holder for forming an electrostatic latent image and holding a toner image. The charger 13 is an example of a charging unit for charging the surface of the photoreceptor drum 12 with predetermined potential. The print head 14 performs exposure on the photoreceptor drum 12 charged by the charger 13. The developing device 15 is an example of a developing unit for developing the electrostatic latent image obtained by the print head 14. The image forming units 11Y, 11M, 11C and 11K form toner images of yellow (Y), magenta (M), cyan (C) and black (K) respectively. Incidentally, the image forming units 11Y, 11M, 11C and 11K may be designated as image forming units 11 without being individually distinguished.

In addition, the image forming process portion 10 are provided with a paper conveyance belt 21, drive rolls 22, transfer rolls 23 and a fixing device 24 so that toner images of the respective colors formed on the photoreceptor drums 12 of the image forming units 11Y, 11M, 11C and 11K respectively can be multi-transferred to recording paper 25. The recording paper 25 is an example of a body to be transferred. The paper conveyance belt 21 conveys the recording paper 25. The drive rolls 22 drive the paper conveyance belt 21. The transfer rolls 23 form an example of a transfer unit by which toner images on the photoreceptor drums 12 are transferred to the recording paper. The fixing device 24 fixes the toner images to the recording paper 25.

In the image forming apparatus 1, the image forming process portion 10 carries out an image forming operation based on various control signals supplied from the image forming controller 30. Under the control of the image forming controller 30, the image processing portion 40 carries out image processing on image data received from the personal computer (PC) 2 or the image reading apparatus 3, and supplies the processed image data to the image forming units 11. For example, in the image forming unit 11K for black (K), the photoreceptor drum 12 rotating in the direction of the arrow A is charged to predetermined potential by the charger 13, and exposed to light by the print head 14. The print head 14 is an example of an exposure unit, which emits light based on the image data supplied from the image processing portion 40. Thus, an electrostatic latent image for a black (K) image is formed on the photoreceptor drum 12. The electrostatic latent image formed on the photoreceptor drum 12 is developed by the developing device 15, and a toner image of black (K) is formed on the photoreceptor drum 12. Also in the image forming units 11Y, 11M and 11C, toner images of yellow (Y), magenta (M) and cyan (C) are formed respectively.

Due to transfer electric fields applied to the transfer rolls 23, the toner images of the respective colors formed on the photoreceptor drums 12 by the image forming units 11 respectively are electrostatically transferred sequentially onto the recording paper 25 supplied with the movement of the paper conveyance belt 21 moving in the direction of the arrow B. Thus, a composite toner image in which toners of the respective colors have been superimposed is formed on the recording paper 25.

After that, the recording paper 25 to which the composite toner image has been electrostatically transferred is conveyed to the fixing device 24. The composite toner image on the recording paper 25 conveyed to the fixing device 24 is fixed onto the recording paper 25 due to fixing processing by heat and pressure in the fixing device 24. The recording paper 25 is then discharged from the image forming apparatus 1.

(Print Head 14)

Figure 2:
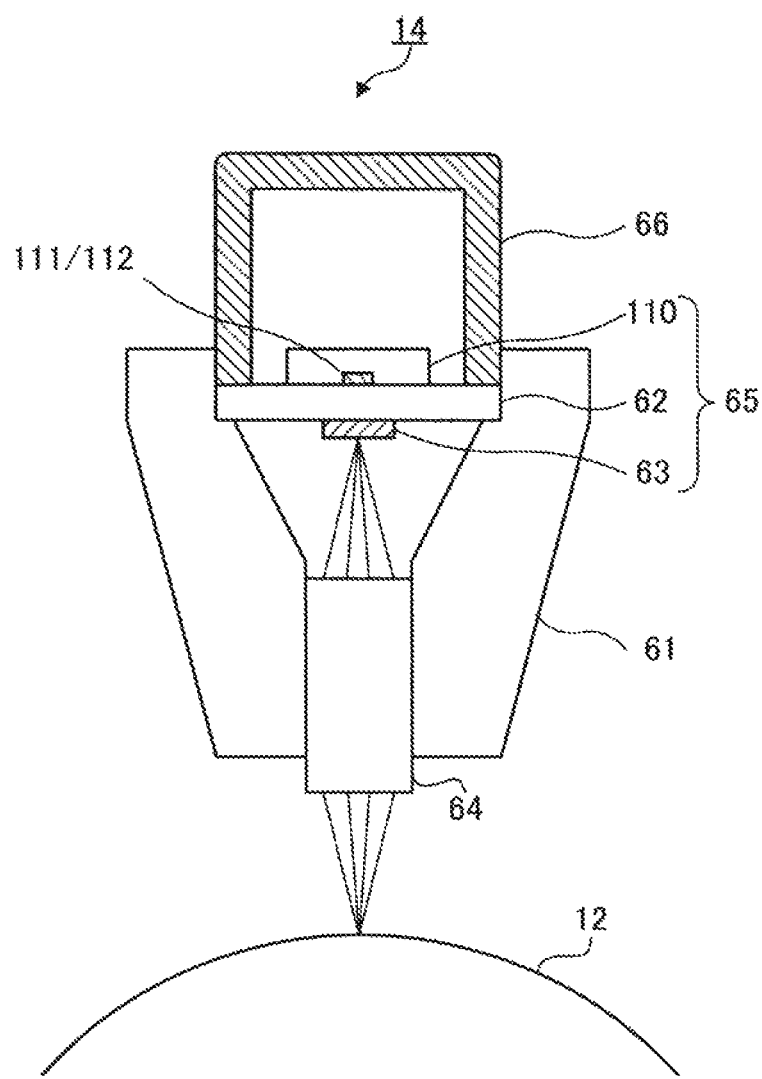
FIG. 2 is a sectional view showing an example of the configuration of a print head.

FIG. 2 is a sectional view showing an example of the configuration of the print head 14. The print head 14 has a housing 61, a light emitting device 65, a rod lens array 64, and a reinforcing member 66. The light emitting device 65 is provided with a light source portion 63 including plural light emitting elements (light emitting thyristors as examples of light emitting elements in the exemplary embodiment) exposing the photoconductor drum 12 to light. The rod lens array 64 is an example of an optical unit by which an image can be formed on the surface of the photoreceptor drum 12 due to the light emitted from the light source portion 63. The reinforcing member 66 reinforces the mechanical strength.

The light emitting device 65 has a mounting board 62. The aforementioned light source portion 63 is provided on one surface (hereinafter referred to as front surface) of the mounting board 62. On the other hand, a drive circuit 110 for driving the light source portion 63, and thermistors 111 and 112 (designated as 111/112 in FIG. 2) for detecting the temperature of the mounting board 62 are provided on the other surface (hereinafter referred to as back surface) of the mounting board 62.

The light emitting device 65 will be described in detail later.

The housing 61 is, for example, formed out of metal. The housing 61 is set to support the mounting board 62 and the rod lens array 64 so that the light emitting surfaces of the light emitting elements in the light source portion 63 can be located in the focal plane of the rod lens array 64. In addition, the rod lens array 64 is disposed along the axial direction (a main scanning direction designated by the X-direction in FIGS. 3A-3B and FIG. 4B, which will be described later) of the photoreceptor drum 12.

The reinforcing member 66 is, for example, formed out of a metal plate.

(Light Emitting Device 65)

FIGS. 3A and 3B are plan views of the light emitting device 65. FIG. 3A is a plan view in one surface of the light emitting device 65, and FIG. 3B is a plan view in the other surface of the light emitting device 65. Incidentally, the light emitting device 65 is an example of a light emitting unit.

In the light emitting device 65 shown in FIGS. 3A and 3B by way of example, the light source portion 63 includes forty light emitting chips C1-C40 on the surface of the mounting board 62. The light emitting chips C1-C40 are arranged into two lines extending in the X-direction as the main scanning direction and in a zigzag manner. Incidentally, the light emitting chips C1-C40 are mounted in a central portion of the mounting board 62 so as not to deflect in one end portion in the longitudinal direction of the mounting board 62. In this manner, the longitudinal length of the mounting board 62, that is, the light emitting device 65 can be reduced. The arrangement of the light emitting chips C1-C40 will be described in detail later.

In the present specification, "-" designates plural constituent elements distinguished individually by their numbers, and means that two elements before and behind "-" and elements corresponding to numbers between the numbers of the two elements are included. For example, the light emitting chips C1-C40 include elements from the light emitting chip C1 to the light emitting chip C40 in numerical order.

The light emitting chips C1-C40 have one and the same configuration. Therefore, the light emitting chips C1-C40 will be referred to as light emitting chips C when they are not distinguished individually.

Incidentally, the exemplary embodiment will be described on the assumption that the total number of light emitting chips C is 40, but the invention is not limited thereto.

In the light emitting device 65, the drive circuit 110 for driving the light source portion 63 is mounted on the back surface of the mounting board 62.

Further, the light emitting device 65 has the thermistor 111 near the drive circuit 110, and the thermistor 112 in an end portion of the mounting board 62 away from the drive circuit 110. The thermistors 111 and 112 detect the temperature of the mounting board 62. The thermistor 111 is an example of a first temperature detector, and the thermistor 112 is an example of a second temperature detector. That is, the second temperature detector is provided in a farther position from the drive circuit 110 than the first temperature detector. Incidentally, two or more second temperature detectors may be provided.

Incidentally, other temperature detectors such as thermocouples may be used in place of the thermistors 111 and 112.

The mounting board 62 is a PCS (Printed Circuit Board) using an insulating material such as a glass epoxy material as a substrate. Wirings (lines) made of a conductive material such as copper (Cu) are formed in the front and back surfaces of the mounting board 62. The wiring in the front surface and the wiring in the back surface are connected by a conductive material through through-holes or the like provided in the substrate.

The drive circuit 110 is, for example, constituted by an ASIC (Application Specific Integrated Circuit) or the like. That is, the drive circuit 110 is an IC chip. The drive circuit 110 may be constituted by plural IC chips. Further, resistors, capacitors, etc. may be provided around the drive circuit 110. Here, there is a case where a component largest in heat generation or a group of plural components including the component largest in heat generation and components provided around the largest component may be designated as drive members. Examples of the drive members include an IC chip mounted with the drive circuit 110, and a chip group including resistor chips, capacitor chips, etc. provided around the IC chip.

Here, the drive circuit 110 is provided just behind the light source portion 63. "Just behind the light source portion 63" means that at least a part of the drive circuit 110 overlaps with a projected image of the light source portion 63 when the light source 63 is projected on the back surface of the mounting board 62. Incidentally, the drive circuit 110 may be provided in a position deviated from the position just behind the light source portion 63.

The drive circuit 110 is provided in a central portion (the part corresponding to the light emitting chips C20 and C21) of the array of the light emitting chips C1-C40. When the drive circuit 110 is provided in the central portion of the array of the light emitting chips C1-C40, wiring arranged (extracted) from the drive circuit 110 to the light emitting chips C1-C40 can be distributed equally in the left/right direction (the X-direction in FIGS. 3A and 3B). Thus, the width (in the Y-direction in FIGS. 3A and 3B) of the mounting board 62 can be suppressed to be small.

Incidentally, the drive circuit 110 may be provided not in the central portion of the array of the light emitting chips C1-C40 but in one end portion or between the end portion and the central portion.

In addition, the IC chip serving as the drive circuit 110 is connected to the wiring (lines) in the back surface of the mounting board 62, for example, by a BGA (Ball Grid Array) or the like.

The thermistors 111 and 112 are NTC (Negative Temperature Coefficient) thermistors, which are elements having negative temperature characteristics in which their resistance values decrease in response to a temperature rise. The temperature detection portions of the thermistors 111 and 112 are fixed in contact with the mounting board 62. Thus, the thermistors 111 and 112 can detect the temperature of the mounting board 62.

Since back electrodes 85 of the light emitting chips C are fixed to the mounting board 62 as will be described later, the temperature of the mounting board 62 is correlated with the temperatures of the light emitting chips C.

Here, each thermistor 111, 112 is provided just behind the light source portion 63 so as to put the mounting board 62 therebetween. "Just behind the light source portion 63" means that at least a part of the thermistor 111, 112 overlaps with a projected image of the light source portion 63 when the light source 63 is projected on the back surface of the mounting board 62. This is to detect the temperature of the light source portion 63 more accurately through the temperature of the mounting board 62.

Incidentally, one or both of the thermistors 111 and 112 may be provided in a position deviated from the position just behind the light source portion 63. In addition, one or both of the thermistors 111 and 112 may be provided in the front surface of the mounting board 62.

Figures 4A, 4B:
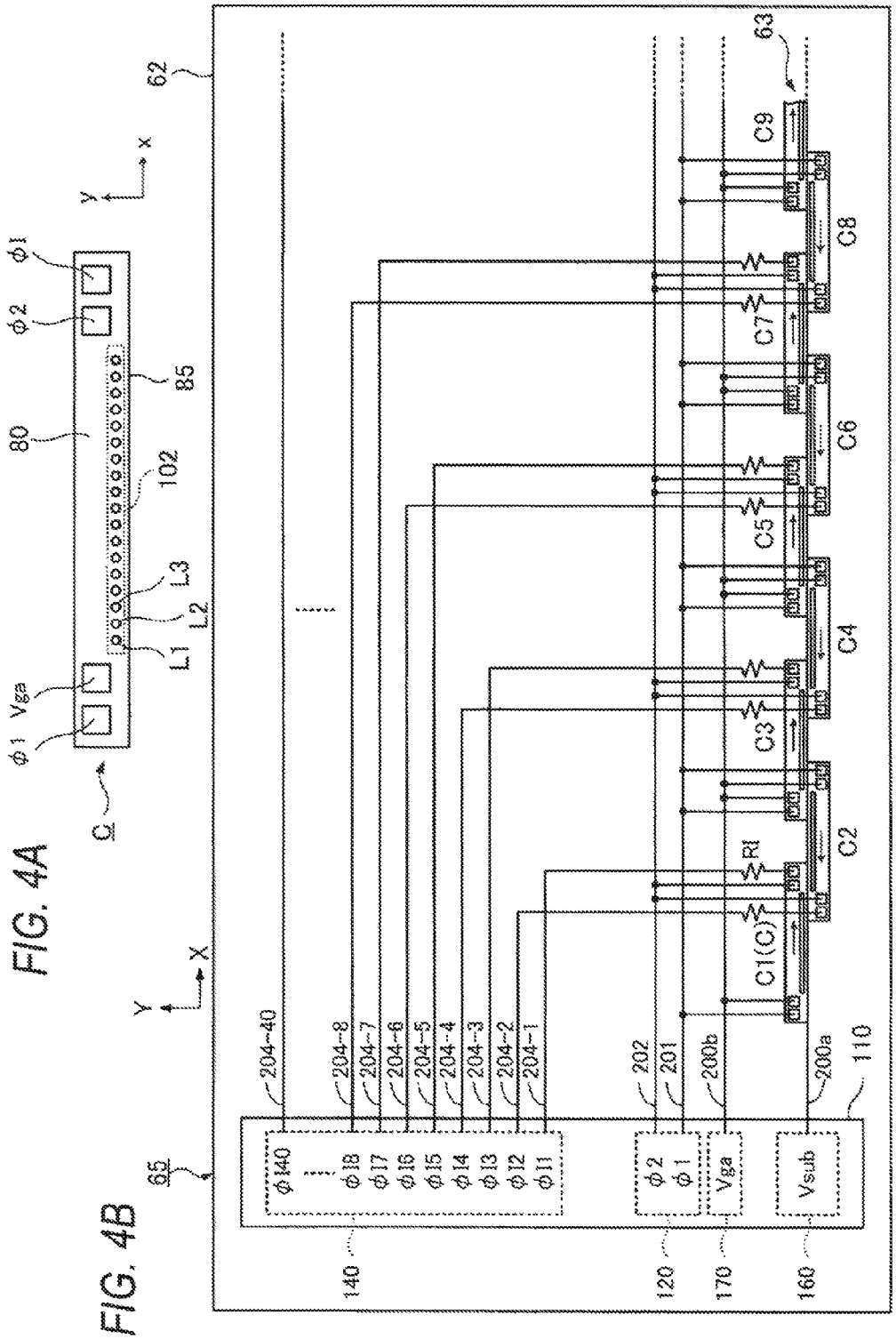
FIGS. 4A and 4B are diagrams showing the configuration of each light emitting chip and the configuration of the light emitting device.

FIGS. 4A and 4B are diagrams showing the configuration of each light emitting chip C and the configuration of the light emitting device 65. FIG. 4A shows the configuration of the light emitting chip C, and FIG. 4B shows the configuration of the drive circuit 110 of the light emitting device 65 and the configuration of wirings (lines) on the mounting board 62.

As described previously, the drive circuit 110 is provided on the back surface of the mounting board 62 and in a central portion of the array of the light emitting chips C1-C40. In FIG. 4B, the drive circuit 110 is depicted on the left side of the mounting board 62 for convenience of explanation.

First, the configuration of the light emitting chip C shown in FIG. 4A will be described.

The light emitting chip C has a light emitting portion 102 constituted by plural light emitting elements (light emitting thyristors L1, L2, L3, . . . in the exemplary embodiment) on a substrate 80 having a rectangular surface shape. The light emitting elements are provided on the closer side to one long side of the rectangular shape and in a line extending along the long side (in the x-direction in FIG. 4A). Further, in the opposite end portions in the long side direction, the light emitting chip C has plural terminals (a φ1 terminal, φ2 terminal, a φI terminal, and a Vga terminal) for importing various drive signals and so on.

Of those terminals, the terminal φ1 and the Vga terminal are provided in order from one end portion of the substrate 80, and the φI terminal and the φ2 terminal are provided in order from the other end portion of the substrate 80. The light emitting portion 102 is provided between the Vga terminal and the φ2 terminal. Further, a back electrode 85 serving as a Vsub terminal is provided on the back surface of the substrate 80.

The back electrode 85 is fixed to a wiring (line) provided in the front surface of the mounting board 62, by silver paste or the like.

The terminals (the φ1 terminal, the φ2 terminal, the φI terminal, and the Vga terminal) are bonding pads, which are connected to wirings (lines) provided in the front surface of the mounting board 62, through bonding wires.

Incidentally, the terminals (the φ1 terminal, the φ2 terminal, the φI terminal, and the Vga terminal) may be arrayed in another order than the order shown in FIG. 4A.

Here, "in a line" does not always mean a case where plural light emitting elements are disposed on a straight line in the x-direction as shown in FIG. 4A. The light emitting elements may be disposed so that they have different displacements from one another in the y-direction perpendicular to the direction of the line. For example, when the light emitting surfaces of the light emitting elements form pixels respectively, each light emitting element may be disposed with a displacement corresponding to several pixels or several tens of pixels in the y-direction perpendicular to the x-direction as the direction of the line. The light emitting elements may be disposed in a zigzag manner in which the light emitting elements are displaced alternately between adjacent ones or between adjacent sets of plural ones.

Next, the configuration of the drive circuit 110 of the light emitting device 65 and the configuration of wirings (lines) on the mounting board 62 will be described with reference to FIG. 4B.

As described previously, on the mounting board 62 of the light emitting device 65, the drive circuit 110 and the light emitting chips C1-C40 are mounted, and wirings (lines) for connecting the drive circuit 110 with the light emitting chips C1-C40 are provided.

First, the configuration of the drive circuit 110 will be described.

The drive circuit 110 receives control signals including a clock signal, reference potential, power supply potential, etc. from the image forming controller 30 shown in FIG. 1, and image data (video signals) processed by the image processing portion 40. The image data are to be supplied to each light emitting chip C.

From the control signals and the image data, the drive circuit 110 generates signals (a first transfer signal φ1, a second transfer signal φ2, and lighting signals φI1-φI40, which will be described later) for driving the light emitting chips C.

Incidentally, the drive circuit 110 corrects emission amounts (radiant energies) and supplies the lighting signals φI1-φI40 (which will be referred to as light signals φI when they are not distinguished individually), as will be described later.

That is, the drive circuit 110 has a transfer signal generating portion 120, which generates the first transfer signal φ1 and the second transfer signal φ2 and supplies them to the light emitting chips C1-C40.

In addition, the drive circuit 110 has a lighting signal generating portion 140, which generates the lighting signals φI1-φI40 based on various control signals and supplies them to the light emitting chips C1-C40 respectively.

Further, the drive circuit 110 has a reference potential supply portion 160 and a power supply potential supply portion 170. The reference potential supply portion 160 supplies the reference potential Vsub to the light emitting chips C1-C40. The reference potential Vsub serves as a reference of potential. The power supply potential supply portion 170 supplies the power supply potential Vga for driving the light emitting chips C1-C40.

Next, the arrangement of the light emitting chips C1-C40 will be described.

The odd-numbered light emitting chips C1, C3, C5, . . . are arranged in a line so as to be spaced from one another in a direction along the long sides of the respective substrates 80. The even-numbered light emitting chips C2, C4, C6, . . . are arranged in the same manner. The odd-numbered light emitting chips C1, C3, C5, . . . and the even-numbered light emitting chips C2, C4, C6, . . . are arranged in a zigzag manner and rotated 180 degrees relatively to each other so that the long side on the light emitting portion 102 side of each odd-numbered light emitting chip C can be opposed to the long side on the light emitting portion 102 side of each even-numbered light emitting chip C. The light emitting chips C are also positioned so that light emitting elements adjacent to each other between adjacent ones of the light emitting chips C can be arranged at the same interval in the main scanning direction (X-direction) as light emitting elements adjacent to each other within the same light emitting element.

Incidentally, FIG. 4B shows the light emitting chips C1-C9. The arrow depicted in each light emitting chip C1-C9 designates the direction in which the light emitting elements of the light emitting portion 102 shown in FIG. 4A are arranged (the numerical order of the light emitting thyristors L1, L2, L3, . . . in the exemplary embodiment).

The wirings (lines) connecting the drive circuit 110 with the light emitting chips C1-C40 will be described. Incidentally, the light emitting chips C1-C40 are provided on the front surface of the mounting board 62. On the other hand, the drive circuit 110 is provided on the back surface of the mounting board 62. Therefore, the wirings (lines) are provided via the front surface and back surface of the mounting board 62 and the through-holes provided in the substrate of the mounting board 62.

A power supply line 200a for supplying the reference potential Vsub is provided in the mounting board 62. The power supply line 200a is connected to the Vsub terminal provided in the back electrode 85 serving as the Vsub terminal provided in the back surface of each light emitting chip C.

A power supply line 200b for supplying the power supply potential Vga for driving each light emitting chip C is provided in the mounting board 62. The power supply line 200b is connected to the Vga terminal provided in each light emitting chip C.

The mounting board 62 is provided with a first transfer signal line 201 and a second transfer signal line 202. The first transfer signal φ1 is transmitted from the transfer signal generating portion 120 of the drive circuit 110 to each light emitting chip C through the first transfer signal line 201. The second transfer signal φ2 is transmitted from the transfer signal generating portion 120 to each light emitting chip C through the second transfer signal line 202. The first transfer signal line 201 is connected to the φ1 terminal of each light emitting chip C, and the second transfer signal line 202 is connected to the φ2 terminal of each light emitting chip C. The first transfer signal φ1 and the second transfer signal φ2 are transmitted to the light emitting chips C1-C40 in common (in parallel).

In addition, the mounting board 62 is provided with lighting signal lines 204_1-204_40. The lighting signals φI1-φI40 are transmitted from the lighting signal generating portion 140 of the drive circuit 110 to the light emitting chips C1-C40 through the lighting signal lines 204_1-204_40 respectively. The lighting signal lines 204_1-204_40 are connected to the φI terminals of the light emitting chips C1-C40 through current limiting resistors RI respectively.

As has described above, the reference potential Vsub and the power supply potential Vga are commonly supplied to the light emitting chips C1-C40 on the mounting board 62. The first transfer signal φ1 and the second transfer signal φ2 are also commonly (in parallel) transmitted to the light emitting chips C1-C40. On the other hand, the lighting signals φI1-φI40 are transmitted to the light emitting chips C1-C40 respectively and individually.

(Configuration of Light Emitting Chip C)

Figure 5:
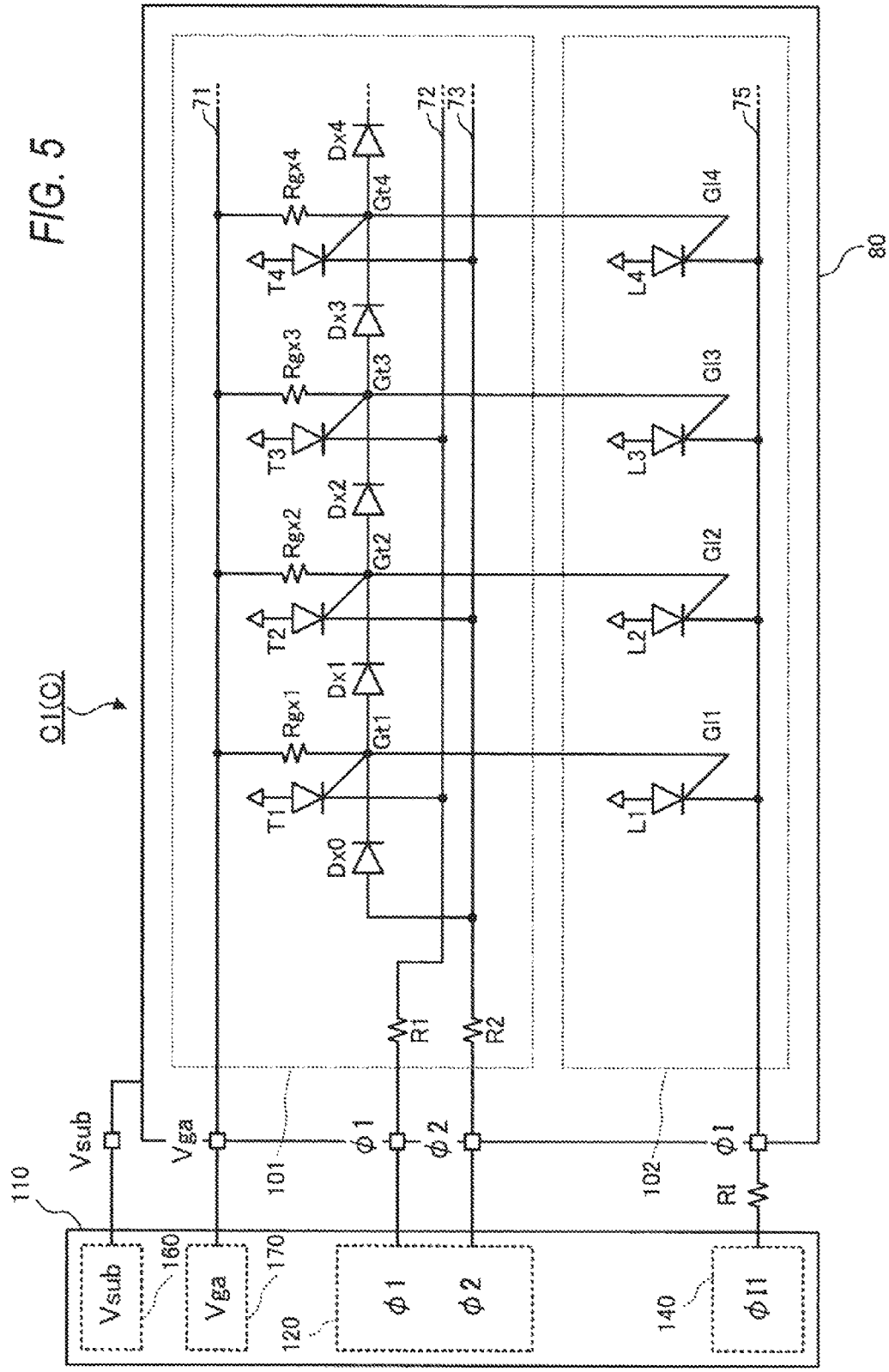
FIG. 5 is an equivalent circuit diagram for explaining the circuit configuration of the light emitting chip mounted with a self-scanning light emitting element array (SLED)

FIG. 5 is an equivalent circuit diagram for explaining the circuit configuration of a light emitting chip C mounted with a self-scanning type light emitting element array (SLED). Incidentally, the positions of the terminals (the φ1 terminal, the φ2 terminal, the Vga terminal and the φI terminal) are different from those in FIG. 4A. The terminals are depicted at the left end of FIG. 5 for convenience of explanation. The Vsub terminal provided in the back surface of the substrate 80 is depicted in a state where it has been extracted to the outside of the substrate 80.

Here, the light emitting chip C1 will be described as a representative of each light emitting chip C in order to explain them including connection to the drive circuit 110. In FIG. 5, the light emitting chip C is therefore referred to as light emitting chip C1(C). The configurations of the other light emitting chips C2-C40 are the same as that of the light emitting chip C1.

The light emitting chip C1(C) has a light emitting portion 102 (see FIG. 4A) constituted by light emitting thyristors L1, L2, L3, . . . arranged in a line on a substrate 80 as described previously.

In addition, the light emitting chip C1(C) has transfer thyristors T1, T2, T3, . . . arranged in a line in the same manner as the light emitting portion 102.

Incidentally, FIG. 5 shows parts of the light emitting chip C1(C) around the light emitting thyristors L1-L4 and the transfer thyristors T1-T4.

In addition, the light emitting chip C1(C) has coupling diodes Dx1, Dx2, Dx3, . . . . Adjacent two of the transfer thyristors T1, T2, T3, . . . are paired with each other in numerical order, and the coupling diodes Dx1, Dx2, Dx3, . . . are provided between the pairs respectively.

Further, the light emitting chip C1(C) has power supply line resistors Rgx1, Rgx2, Rgx3, . . . .

In addition, the light emitting chip C1(C) has a start diode Dx0. The light emitting chip C1(C) also has current limiting resistors R1 and R2 for preventing an excessive current from flowing into the first transfer signal line 72 through which the first transfer signal φ1 is transmitted, and the second transfer signal line 73 through which the second transfer signal φ2 is transmitted, as will be described later.

The light emitting thyristors L1, L2, L3, . . . and the transfer thyristors T1, T2, T3, . . . are arranged in numerical order from the left side in FIG. 5. Further, the coupling diodes Dx1, Dx2, Dx3, . . . and the power supply line resistors Rgx1, Rgx2, Rgx3, . . . are also arranged in numerical order from the left side in FIG. 5.

The light emitting thyristors L1, L2, L3, . . . and the transfer thyristors T1, T2, T3, . . . are arrayed in order of the transfer thyristors T1, T2, T3, . . . and the light emitting thyristors L1, L2, L3, . . . from top to bottom in FIG. 5.

Here, the light emitting thyristors L1, L2, L3, . . . , the transfer thyristors T1, T2, T3, . . . , the coupling diodes Dx1, Dx2, Dx3, . . . , and the power supply line resistors Rgx1, Rgx2, Rgx3, . . . will be referred to as light emitting thyristors L, transfer thyristors T, coupling diodes Dx, and power supply line resistor Rgx respectively when they are distinguished individually.

The number of light emitting thyristors L may be set in advance. In the exemplary embodiment, the number of light emitting thyristors L is 128 by way of example. On this occasion, the number of transfer thyristors T is also 128. Likewise, the number of power supply line resistors Rgx is also 128. However, the number of coupling diodes Dx is 127, which is smaller than the number of transfer thyristors T by one.

Incidentally, the number of transfer thyristors T may be larger than the number of light emitting thyristors L.

Each of the aforementioned thyristors (the light emitting thyristors L and the transfer thyristors T) is a semiconductor device having three terminals, that is, a gate terminal, an anode terminal and a cathode terminal.

The anode terminals of the transfer thyristors T and the light emitting thyristors L are connected to the substrate 80 of the light emitting chip C1(C) (anode common).

In addition, the anode terminals are connected to the power supply line 200a (see FIG. 4B) through the back electrode 85 serving as the Vsub terminal and provided in the back surface of the substrate 80. The reference potential Vsub is supplied from the reference potential supply portion 160 through the power supply line 200a.

The cathode terminals of the odd-numbered transfer thyristors T1, T3, . . . in the arrangement of the transfer thyristors T are connected to the first transfer signal line 72. The first transfer signal line 72 is connected to the φ1 terminal through the current limiting resistor R1. The first transfer signal φ1 is received from the φ1 terminal.

On the other hand, the cathode terminals of the even-numbered transfer thyristors T2, T4, . . . in the arrangement of the transfer thyristors T are connected to the second transfer signal line 73. The second transfer signal line 73 is connected to the φ2 terminal through the current limiting resistor R2. The second transfer signal φ2 is received from the φ2 terminal.

The cathode terminals of the light emitting thyristors L1, L2, L3, . . . are connected to the lighting signal line 75. The lighting signal line 75 is connected to the φI terminal. The φI terminal of the light emitting chip C1 is connected to the lighting signal line 204_1 through the current limiting resistor RI so that the lighting signal φI1 can be received from the lighting signal generating portion 140. Incidentally, the φI terminals of the other light emitting chips C2-C40 are connected to the lighting signal lines 204_2-204_40 through the current limiting resistors RI respectively, so that the lighting signals φI2-φI40 can be received from the lighting signal generating portion 140.

Gate terminals Gt1, Gt2, Gt3, . . . of the transfer thyristors T1, T2, T3, . . . are connected to gate terminals Gl1, Gl2, Gl3, . . . of the light emitting thyristors L1, L2, L3, . . . with the same numbers respectively in one to one correspondence. Therefore, each of the gate terminals Gt1, Gt2, Gt3, . . . has electrically the same potential as a correspondingly numbered one of the gate terminals Gl1, Gl2, Gl3, . . . . Therefore, for example, the gate terminal Gt1 may be referred to as gate terminal Gt1(Gl1).

Also here, the gate terminals Gt1, Gt2, Gt3, . . . , and the gate terminals Gl1, Gl2, Gl3, . . . will be referred to as gate terminals Gt and gate terminals Gl when they are not distinguished individually. In addition, they may be referred to as gate terminals Gt(Gl).

Adjacent two of the gate terminals Gt1, Gt2, Gt3, . . . of the transfer thyristors T1, T2, T3, . . . are paired with each other in numerical order, and the coupling diodes Dx1, Dx2, Dx3, . . . are connected between the paired gate terminals Gt respectively. That is, the coupling diodes Dx1, Dx2, Dx3, . . . are connected in series so as to be put among the gate terminals Gt1, Gt2, Gt3, . . . in order. The coupling diode Dx1 is connected so that the direction of the coupling diode Dx1 can follow the direction of an current flowing from the gate terminal Gt1 toward the gate terminal Gt2. The same thing can be applied to the other coupling diodes Dx2, Dx3, Dx4, . . . .

The gate terminals Gt(Gl) of the transfer thyristors T are connected to the power supply line 71 through the power supply line resistors Rgx provided in accordance with the transfer thyristors T respectively. The power supply line 71 is connected to the Vga terminal.

The gate terminal Gt1 of the transfer thyristor T1 on one end side of the transfer thyristor array is connected to the cathode terminal of the start diode Dx0. On the other hand, the anode terminal of the start diode Dx0 is connected to the second transfer signal line 73.

In FIG. 5, of the light emitting chip C1(C), the part provided with the transfer thyristors T, the coupling diodes Dx, the power supply resistors Rgx, the start diode Dx0 and the current limiting resistors R1 and R2 is referenced as a transfer portion 101. As described previously, the part provided with the light emitting thyristors L corresponds to the light emitting portion 102.

Each light emitting chip C is, for example, constituted by a group III-V compound semiconductor such as GaAs or GaAlAs. That is, the light emitting chip C has a pnpn structure in which a first semiconductor layer having p-type conductivity, a second semiconductor layer having n-type conductively, a third semiconductor layer having p-type conductivity, and a fourth semiconductor layer having n-type conductivity have been laminated sequentially on a substrate having p-type conductivity. The light emitting chip C is constituted by plural islands in which plural semiconductor layers have been separated from one another by separation grooves.

(Operation of Light Emitting Device 65)

Next, the operation of the light emitting device 65 will be described.

As described previously, the light emitting device 65 are provided with the light emitting chips C1-C40 (see FIGS. 3A-3B and 4A-4B).

As shown in FIG. 4B, the reference potential Vsub and the power supply potential Vga are supplied in common to all the light emitting chips C1-C40 on the mounting board 62. In the same manner, the first transfer signal φ1 and the second transfer signal φ2 are transmitted to the light emitting chips C1-C40 in common (in parallel).

On the other hand, the lighting signals φI1-φI40 are transmitted to the light emitting chips C1-C40 respectively and individually. The lighting signals φI1-φI40 are signals for setting the light emitting thyristors L of the light emitting chips C1-C40 in a lighting state or a non-lighting state in accordance with the image data respectively. Therefore, the lighting signals φI1-φI40 have different waveforms from one another depending on the image data. However, the lighting signals φI1-φI40 are transmitted in parallel.

Since the light emitting chips C1-C40 are driven in parallel, it is sufficient that the operation of the light emitting chip C1 will be described.

<Thyristors>

The fundamental operation of the thyristors (the transfer thyristors T and the light emitting thyristors L) will be described before description of the operation of the light emitting chip C1. Each thyristor is a semiconductor device having three terminals, that is, an anode terminal, a cathode terminal and a gate terminal as described previously.

The following description will be made on the assumption that the reference potential Vsb to be supplied to the back electrode 85 serving as the Vsub terminal is high-level potential (hereinafter referred to as "H") which is 0 V, and the power supply potential Vga to be supplied to the Vga terminal is low-level potential (hereinafter referred to as "L") which is −3 V.

In the exemplary embodiment, the light emitting device 65 is driven by negative potential.

The anode terminal of each thyristor is in the reference potential Vsub ("H" (0 V)) supplied to the back electrode 85.

The thyristor has a pnpn structure constituted by four semiconductor layers, that is, a p-type first semiconductor layer, an n-type second semiconductor layer, a p-type third semiconductor layer and an n-type fourth semiconductor layer laminated on a p-type substrate. The following description will be made on the assumption that forward direction potential (diffusion potential) Vd of a pn junction constituted by a p-type semiconductor layer and an n-type semiconductor layer of a group III-V compound semiconductor such as GaAs or GaAlAs is 1.5 V by way of example.

When lower potential (negative potential with a large absolute value) than a threshold voltage is applied to the cathode terminal of the thyristor in an OFF state where a current is small (not to flow) between the anode terminal and the cathode terminal, the thyristor moves to an ON state (turns ON). Here, the threshold voltage of the thyristor is a value obtained by subtracting the forward direction potential Vd (1.5 V) of the pn junction from the potential of the gate terminal. Therefore, when the potential of the gate terminal is 0 V, the threshold voltage of the thyristor is −1.5 V. That is, when lower potential than −1.5 V is applied to the cathode terminal, the thyristor turns ON. When the thyristor turns ON, the thyristor is brought into a state (ON state) where a current has flowed between the anode terminal and the cathode terminal.

The potential of the gate terminal of the thyristor in the ON state reaches potential close to the potential of the anode terminal. Here, assume that the potential of the gate terminal is 0 V ("H") because the anode terminal has been set at the reference potential Vsub (0 V ("H")). On the other hand, the cathode terminal of the thyristor in the ON state has potential close to potential obtained by subtracting the forward direction potential Vd (1.5 V) of the pn junction from the potential of the anode terminal. Here, the potential of the cathode terminal of the thyristor in the ON state has potential (negative potential with an absolute value larger than 1.5 V) close to −1.5 V because the anode terminal is set at the reference potential Vsub (0 V ("H")). Incidentally, the potential of the cathode terminal is set depending on the relation to a power supply which supplies a current to the thyristor in the ON state.

When higher potential (negative potential with a small absolute value, 0V, or positive potential) than potential (the aforementioned potential close to −1.5 V) required for keeping the ON state is applied to the cathode terminal of the thyristor which has once turned ON, the thyristor moves to the OFF state (turns OFF). For example, when the cathode terminal reaches "H" (0 V), the potential of the cathode terminal is higher than the potential required for keeping the ON state, and the potential of the cathode terminal is as high as the potential of the anode terminal. Thus, the thyristor turns OFF.

On the contrary, when lower potential (negative potential with a large absolute value) than the potential required for keeping the ON state is continuously applied to the cathode terminal of the thyristor which is in the ON state, the thyristor keeps the ON state.

When the light emitting thyristor L turns ON, the light emitting thyristor L is lit (emits light). When the light emitting thyristor L turns OFF, the light emitting thyristor is put out (not lit). The emission amount of the light emitting thyristor L in the ON state depends on an area of the light emitting surface from which light is emitted, and a current flowing between the cathode terminal and the anode terminal.

<Timing Chart>

Figure 6:
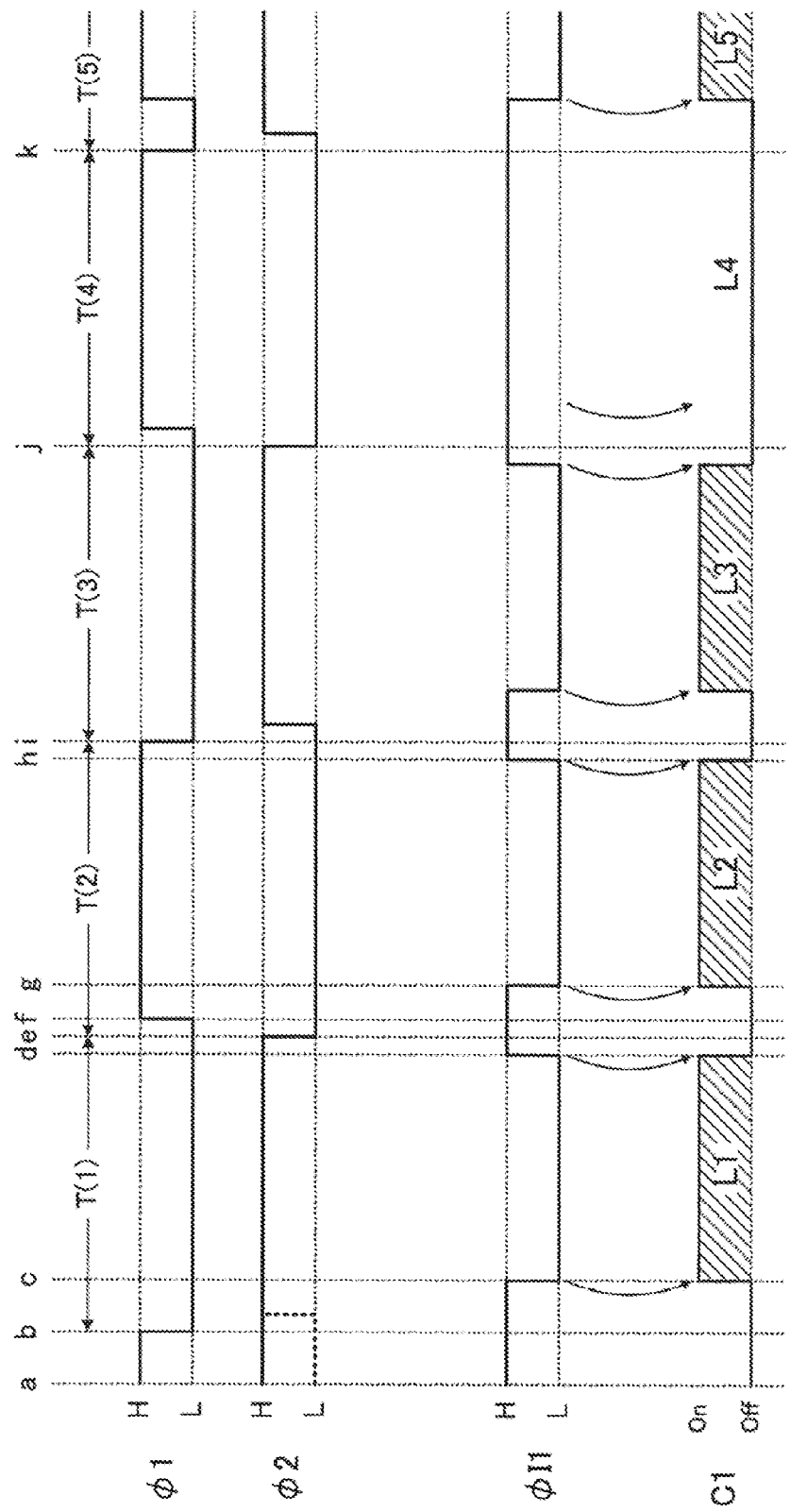
FIG. 6 is a timing chart for explaining the operation of the light emitting device and the light emitting chip.

FIG. 6 is a timing chart for explaining the operation of the light emitting device 65 and the light emitting chip C.

FIG. 6 shows a timing chart of a part making control (referred to as lighting control) to tarn on/off five light emitting thyristors L, that is, the light emitting thyristors L1-L5 of the light emitting chip C1. As described previously, since the other light emitting chips C2-C40 operate in parallel with the light emitting chip C1, it is sufficient that the operation of the light emitting chip C1 will be described.

Incidentally, in FIG. 6, the light emitting thyristors L1, L2, L3 and L5 of the light emitting chip C1 are lit, while the light emitting thyristor L4 is put out (not lit).

In FIG. 6, assume that time goes in alphabetical order from time a to time k. Control of lighting or non-lighting (lighting control) is performed on the light emitting thyristor L1 in a period T(1) from time b to time e, on the light emitting thyristor L2 in a period T(2) from the time e to time i, on the light emitting thyristor L3 in a period T(3) from the time i to time j, and on the light emitting thyristor L4 in a period T(4) from the time j to the time k. In the same manner, lighting control is also performed on the other light emitting thyristors assigned with numbers not lower than 5.

Description will be made about the waveforms of the first transfer signal φ1, the second transfer signal φ2, and the lighting signal φI1. Incidentally, the period from the time a to the time b is a period when the light emitting chip C1 (the same thing can be applied to the light emitting chips C2-C40) begins to operate. Signals in this period will be explained when the operation is described.

The first transfer signal φ1 transmitted to the φ1 terminal (see FIG. 5 and FIG. 6) and the second transfer signal φ2 transmitted to the φ2 terminal (see FIG. 5 and FIG. 6) are signals which can have two potentials "H" and "L". The first transfer signal φ1 and the second transfer signal φ2 repeat waveforms in units of two consecutive periods T (for example, the period T(1) and the period T(2)).

The first transfer signal φ1 moves from "H" to "L" at the start time b of the period T(1), and moves from "L" to "H" at the time f. Then, the first transfer signal φ1 moves from "H" to "L" at the end time i of the period T(2).

The second transfer signal φ2 is "H" at the start time b of the period T(1), and moves from "H" to "L" at the time e. Then, the second transfer signal φ2 keeps "L" at the end time i of the period T(2).

When the first transfer signal φ1 and the second transfer signal φ2 are compared with each other, the second transfer signal φ2 corresponds to a signal in which the first transfer signal φ1 has been shifted later by the period T on the time axis. In the first transfer signal φ1, the waveform in the period T(1) and the waveform in the period T(2) are repeated in and after the period T(3). On the other hand, in the second transfer signal φ2, the waveform shown by the broken line in the period (1) and the waveform in the period T(2) are repeated in and after the period T(3). The waveform of the second transfer signal φ2 in the period T(1) differs from that in and after the period T(3) because the period T(1) is a period when the light emitting device 65 begins to operate.

The paired transfer signals, that is, the first transfer signal φ1 and the second transfer signal φ2 propagate the ON state to the transfer thyristors T shown in FIG. 5 in numerical order. Thus, the light emitting thyristors L whose numbers correspond to the numbers of the transfer thyristors T in the ON state are designated as targets to be controlled to be lit or not lit (lighting control)

Next, the lighting signal φI1 transmitted to the φI terminal of the light emitting chip C1 will be described. Incidentally, the lighting signals φI2-φI40 are transmitted to the light emitting chip C2-C40 respectively. The lighting signal φI1 is a signal which can have two potentials "H" and "L".

Here, the lighting signal φI1 will be described in the period T(1) of lighting control on the light emitting thyristor L1 of the light emitting chip C1. Incidentally, assume that the light emitting thyristor L1 is lit.

The lighting signal φI1 is "H" at the start time b of the period T(1), and moves from "H" to "L" at the time c. Then, the lighting signal φI1 moves from "L" to "H" at the time d, and keeps "H" at the end time e of the period T(1).

With reference to FIGS. 4A-4B and FIG. 5, the operation of the light emitting device 65 and the light emitting chip C1 will be described along the timing chart shown in FIG. 6. Incidentally, the following description will be made about the periods T(1) and T(2) when lighting control is performed on the light emitting thyristors L1 and L2.

(1) Time a

<Light Emitting Device 65>

At the time a, the reference potential supply portion 160 of the drive circuit 110 of the light emitting device 65 sets the reference potential Vsub as "H" (0 V). The power supply potential supply portion 170 sets the power supply potential Vga as "L" (−3.3 V). As a result, the power supply line 200a on the mounting board 62 of the light emitting device 65 reaches "H" (0 V) set in the reference potential Vsub, and the Vsub terminal of each light emitting chip C1-C40 reaches "H". In the same manner, the power supply line 200b reaches "L" (−3.3 V) of the power supply potential Vga, and the Vga terminal of each light emitting chip C1-C40 reaches "L" (see FIG. 4B). As a result, the power supply line 71 of each light emitting chip C1-C40 reaches "L" (see FIG. 5).

Then the transfer signal generating portion 120 of the drive circuit 110 sets the first transfer signal φ1 and the second transfer signal φ2 as "H". Thus, the first transfer signal line 201 and the second transfer signal line 202 reach "H" (see FIG. 4B). As a result, the φ1 terminal and φ2 terminal of each light emitting chip C1-C40 reach "H". The potential of the first transfer signal line 72 connected to the φ1 terminal through the current limiting resistor R1 also reaches "H", and the potential of the second transfer signal line 73 connected to the φ1 terminal through the current limiting resistor R2 also reaches "H" (see FIG. 5).

Further, the lighting signal generating portion 140 of the drive circuit 110 sets the lighting signals φI1-φI40 as "H". As a result, the lighting signal lines 204_1-204_40 reach "H" (see FIG. 4B). Thus, the φI terminal of each light emitting chip C1-C40 reaches "H" through the current limiting resistor RI, and the lighting signal line 75 connected to the φI terminal also reaches "H" (see FIG. 5).

<Light Emitting Chip C1>

The anode terminals of the transfer thyristors T and the light emitting thyristors L are connected to the Vsub terminal. Therefore, the anode terminals are set as "H" (0V).

The cathode terminals of the odd-numbered transfer thyristors T1, T3, T5, . . . are connected to the first transfer signal line 72, and set as "H". The cathode terminals of the even-numbered transfer thyristors T2, T4, T6, . . . are connected to the second transfer signal line 73, and set as "H". Accordingly, each transfer thyristor T is in the OFF state because both the anode terminal and the cathode terminal thereof are "H".

The cathode terminal of each light emitting thyristor L is connected to the lighting signal line 75 which is "H". Accordingly, the light emitting thyristor L is also in the OFF state because both the anode terminal and the cathode terminal thereof are "H".

The gate terminal Gt1 at one end of the transfer thyristor array in FIG. 5 is connected to the cathode terminal of the start diode Dx0 as described previously. The gate terminal Gt1 is connected to the power supply line 71 of the power supply potential Vga ("L" (−3.3 V)) through the power supply line resistor Rgx1. The anode terminal of the start diode Dx0 is connected to the second transfer signal line 73, and connected to the φ2 terminal of "H" (0 V) through the current limiting resistor R2. Accordingly, the start diode Dx0 is forward biased. The cathode terminal (gate terminal Gt1 (Gl1)) of the start diode Dx0 has a potential value (−1.5 V) obtained by subtracting the forward direction potential Vd (1.5 V) of the pn junction from the potential ("H" (0V)) of the anode terminal of the start diode Dx0. In addition, when the gate terminal Gt1 reaches −1.5 V, the coupling diode Dx1 whose anode terminal (gate terminal Gt1) is −1.5 V and whose cathode terminal is connected to the power supply line 71 ("L" (−3.3 V)) through the power supply line resistor Rgx2 is forward biased. Accordingly, the potential of the gate terminal Gt2 reaches −3 V obtained by subtracting the forward direction potential Vd (1.5 V) of the pn junction from the potential (−1.5 V) of the gate terminal Gt1. However, each gate terminal Gt whose number is not lower than 3 is not influenced by the fact that the anode terminal of the start diode Dx0 is "H" (0 V). The potential of the gate terminal Gt is "L" (−3.3 V) as low as the potential of the power supply line 71.

Incidentally, as described previously, the gate terminal Gt is connected to the gate terminal Gl. Accordingly, the potential of the gate terminal Gl is equal to the potential of the gate terminal Gt. Therefore, the threshold voltage of each transfer thyristor T and each light emitting thyristor L is a value obtained by subtracting the forward direction potential Vd (1.5 V) of the pn junction from the potential of the gate terminal Gt (Gl). That is, the threshold voltage of the transfer thyristor T1 and the light emitting thyristor L1 is −3 V, the threshold voltage of the transfer thyristor T2 and the light emitting thyristor L2 is −4.5 V, and the threshold voltage of the transfer thyristors T and the light emitting thyristors L whose numbers are not lower than 3 is −4.8 V.

(2) Time b

At the time b shown in FIG. 6, the first, transfer signal φ1 moves from "H" (0 V) to "L" (−3.3 V). As a result, the light emitting device 65 and the light emitting chip C1 begin to operate. The operation of the light emitting chip C1 will be described below.

When the first transfer signal φ1 moves from "H" to "L", the potential of the first transfer signal line 72 moves from "H" to "L" through the φ1 terminal and the current limiting resistor R1. Thus, the transfer thyristor T1 whose threshold voltage is −3 V turns ON.

When the transfer thyristor T1 turns CM, the potential of the first transfer signal line 72 reaches −1.5 V obtained by subtracting the forward direction potential Vd (1.5 V) of the pn junction from the potential ("H" (0 V)) of the anode terminal.

When the transfer thyristor T1 turns on, the potential of the gate terminal Gt1 (Gl1) reaches "H" (0 V) as high as the potential of the anode terminal of the transfer thyristor T1. Thus, the potential of the gate terminal Gt2 (Gl2) reaches −1.5 V, the potential of the gate terminal Gt3 (Gl3) reaches −3 V, and the potential of each gate terminal Gt (Gl) whose number is not lower than 4 reaches "L" (−3.3 V).

As a result, the threshold voltage of the light emitting thyristor L1 is −1.5 V, the threshold voltage of the transfer thyristor T2 and the light emitting thyristor L2 is −3 V, and the threshold voltage of the transfer thyristors T and the light emitting thyristors L whose numbers are not lower than 4 is −4.8 V.

(3) Time c

At the time c, the lighting signal φI1 moves from "H" to "L".

Accordingly, the lighting signal line 75 moves from "H" to "L" through the current limiting resistor RI and the φ1 terminal. Thus, the potential of the light emitting thyristor L1 whose threshold voltage is −1.5 V turns ON to be lit (emit light). As a result, the potential of the lighting signal line 75 reaches potential (negative potential whose absolute value is larger than 1.5 V) close to −1.5 V.

(4) Time d

At the time d, the lighting signal φI1 moves from "L" to "H".

Accordingly, the potential of the lighting signal line 75 moves from "L" to "H" through the current limiting resistor RI and the φ1 terminal. Thus, the light emitting thyristor L1 turns OFF to be put out (not lit) because both the anode terminal and the cathode terminal reach "H". The lighting period of the light emitting thyristor L1 is a period when the lighting signal φI1 is "L" between the time c when the lighting signal φI1 moves from "H" to "L" and the time d when the lighting signal φI1 moves from "L" to "H".

(5) Time e

At the time e, the second transfer signal φ2 moves from "H" to "L". Here, the period T(1) in which lighting control is performed on the light emitting thyristor L1 is terminated, and the period T(2) in which lighting control is performed on the light emitting thyristor L2 is started.

When the second transfer signal φ2 moves from "H" to "L", the potential of the second transfer signal line 73 moves from "H" to "L" through the φ2 terminal. As described previously, the threshold voltage of the transfer thyristor T2 is −3 V. Therefore, the transfer thyristor T2 turns ON. As a result, the potential of the gate terminal Gt2 (Gl2) reaches "H" (0 V), the potential of the gate terminal Gt3 (Gl3) reaches −1.5 V, and the potential of the gate terminal Gt4 (Gl4) reaches −3 V. The potential of each gate terminal Gt (Gl) whose number is not lower than 5 reaches −3.3 V.

(6) Time f

At the time f, the first transfer signal φ1 moves from "L" to "H".

Accordingly, the potential of the first transfer signal line 72 moves from "L" to "H" through the φ1 terminal. Thus, the transfer thyristor T1 in the OK state turns OFF because both the anode terminal and the cathode terminal reach "H". In response thereto, the potential of the gate terminal Gt1 (Gl1) changes toward the power supply potential Vga ("L" (−3.3 V)) of the power supply line 71 through the power supply line resistor Rgx1. As a result, the coupling diode Dx1 is brought into a state where potential has been applied in a direction to prevent a current from flowing therein (reverse biased). Therefore, the gate terminal Gt1 (Gl1) is not influenced by the fact that the gate terminal Gt2 (Gl2) is "H" (0 V). That is, the threshold voltage of the transfer thyristor T including the gate terminal Gt to which the reverse biased coupling diode Dx is connected reaches −4.8 V, so that the transfer thyristor T cannot, turn off in response to the first transfer signal φ1 or the second transfer signal φ2 which is "L" (−3.3 V).

(7) Etcetera

When the lighting signal φI1 moves from "H" to "L" at the time g, the light emitting thyristor L2 turns OH to be lit in the same manner as the light emitting thyristor L1 at the time c.

When the lighting signal φI1 moves from "L" to "H" at the time h, the light emitting thyristor L2 turns OFF to be put out in the same manner as the light emitting thyristor L1 at the time d.

Further, when the lighting signal φI1 moves from "H" to "L" at the time i, the transfer thyristor T3 whose threshold voltage is −3 V turns ON in the same manner as the transfer thyristor T1 at the time b or the transfer thyristor T2 at the time e. At the time i, the period T(2) in which lighting control is performed on the light emitting thyristor L2 is terminated, and the period T(3) in which lighting control is performed on the light emitting thyristor L3 is started.

After that, the operation which has been described is repeated.

Incidentally, in order to make a light emitting thyristor L not lit (not emit light) but keep it put out (not lit), it will go well if the lighting signal φI is kept in "H" (0 V) as in the lighting signal φI1 shown from the time to the time k in the period T(4) in which lighting control is performed on the light emitting thyristor L4 in FIG. 6. In this manner, the light emitting thyristor L4 can be kept being put out (not lit) even if the threshold voltage of the light emitting thyristor L4 is −1.5 V.

As has been described above, the gate terminals Gt of the transfer thyristors T are connected to each other by the coupling diodes Dx. Accordingly, when the potential of one gate terminal Gt has changed, there appears a change in the potential of another gate terminal Gt connected through a forward-biased coupling diode Dx to the gate terminal Gt whose potential has changed. Thus, there appears a change in the threshold voltage of the transfer thyristor T including the gate terminal whose potential has changed. When the threshold voltage of the transfer thyristor T is higher than "L" (−3.3 V) (negative potential whose absolute value is small), the transfer thyristor T turns ON at the timing when the first transfer signal φ1 or the second transfer signal φ2 moves from "H" (0 V) to "L" (−3.3 V).

The threshold voltage of the light emitting thyristor L whose gate terminal Gl is connected to the gate terminal Gt of the transfer thyristor T in the ON state is −1.5 V. Therefore, the light emitting thyristor L turns ON to be lit (emit light) when the lighting signal φI moves from "H" to "L".

That is, the transfer thyristor T enters the ON state to thereby designate the light emitting thyristor L as a target of lighting control. The lighting signal φI sets the light emitting thyristor L as a target of lighting control to be lit or not lit.

In this manner, the waveform of each lighting signal φI is set in accordance with image data so as to control each light emitting thyristor L to be lit or not lit.

The light emitting device 65 has a variation in light emission amount (emission amount) among the light emitting thyristors L due to a difference in characteristics among the light emitting thyristors L at the time of manufacturing, or a difference in temperature among the light emitting thyristors L.

Incidentally, the emission amounts of the light emitting thyristors L fluctuate due to a temperature change of the light emitting device 65 as a whole. In this case, the emission amounts of the light emitting thyristors L fluctuate concurrently.

That is, in each light emitting thyristor L constituted by a group III-V compound semiconductor such as GaAs or GaAlAs, the emission amount decreases with increase in temperature.

Therefore, in the exemplary embodiment, the emission amounts of the light emitting thyristors L are corrected (emission amount correction) to suppress a variation (fluctuation) in emission amount among the light emitting thyristors L.

The emission amount correction here is attained by adjustment of a lighting period in which each light emitting thyristor L is lit (emitting light). For example, in the light emitting thyristor L1, the lighting period from the time c to the time d in FIG. 6 is adjusted. That is, a lighting period for a light emitting thyristor L small in emission amount is made longer than a predetermined lighting period, while a lighting period for a light emitting thyristor L large in emission amount is set to be shorter than a predetermined lighting period.

(Emission Amount Correction)

Correction of emission amounts (emission amount correction) will be described below.

First, description will be made about fluctuation in emission amount caused by a temperature difference among the light emitting thyristors L of the light source portion 63 in the print head 14.

Figure 7:
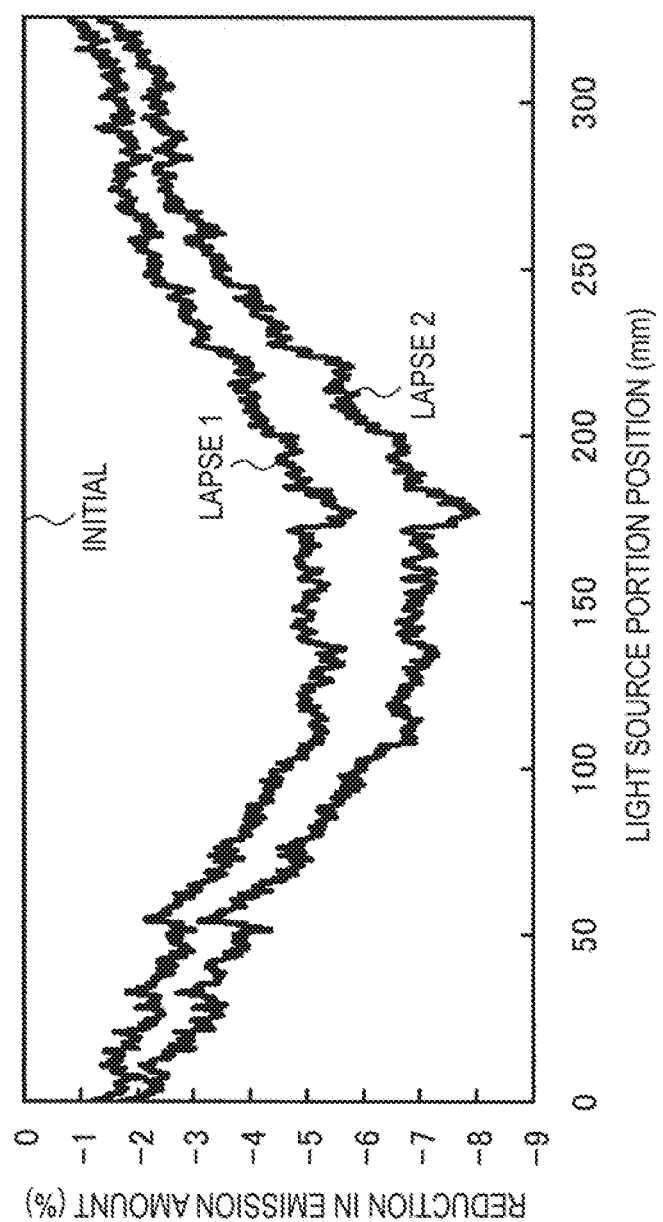
FIG. 7 is a graph showing an example of fluctuation in emission amount (reduction in emission amount) caused by a temperature difference among light emitting thyristors in the print head.

FIG. 7 is a graph showing an example of fluctuation in emission amount (reduction in emission amount) caused by a temperature difference among the light emitting thyristors L in the print head 14. The abscissa designates a position within the light source portion 63. Here, the light source portion 63 is 326 mm long. The ordinate designates the reduction ratio of an emission amount (reduction in emission amount) expressed by percentages.

As shown in FIGS. 3A and 3B, assume that the drive circuit 110 is disposed in a central portion of the mounting board 62. As for the difference in emission amount among the light emitting thyristors L at the time of manufacturing, the lighting period of each light emitting thyristor L is set to suppress a variation in emission amount based on the measured characteristics of the light emitting thyristor L at the time of manufacturing of the light emitting device 65.

In FIG. 7, "initial" means time just after the operation of the light emitting device 65 is started. At the initial time, a temperature rise of the drive circuit 110 is small. Therefore, reduction in emission amount cannot be seen in the light source portion 63.

"Lapse 1" means time after some time has passed since the operation start of the light emitting device 65. At Lapse 1, the temperature of the drive circuit 110 has increased. However, the temperature rise is not saturated but on the way. Reduction in emission amount is larger in the central portion of the light source portion 63 than in either end portion. Incidentally, the reduction in emission amount in the central portion is 5% to 6%. This is because the drive circuit 110 is provided in the central portion of the mounting board 62, causing a temperature rise in the central portion of the mounting board 62 as compared with the temperature in the opposite end portions. As a result, the emission amounts of the light emitting thyristors L decrease.

Further, "Lapse 2" means time after long time has passed since the operation start of the light emitting device 65. At this time, the temperature of the drive circuit 110 is saturated. Even at Lapse 2, reduction in emission amount is larger in the central portion of the light source portion 63 than in either end portion. Incidentally, the reduction in emission amount in the central portion is 7% to 8%.

Reduction in emission amount not lower than 0.5% can be visually recognized as fluctuation in density in a toner image fixed to the recording paper 25. That is, it is preferable that the reduction in emission amount caused by a difference in temperature among the light emitting thyristors L is suppressed to be lower than 0.5%.

Figure 8:
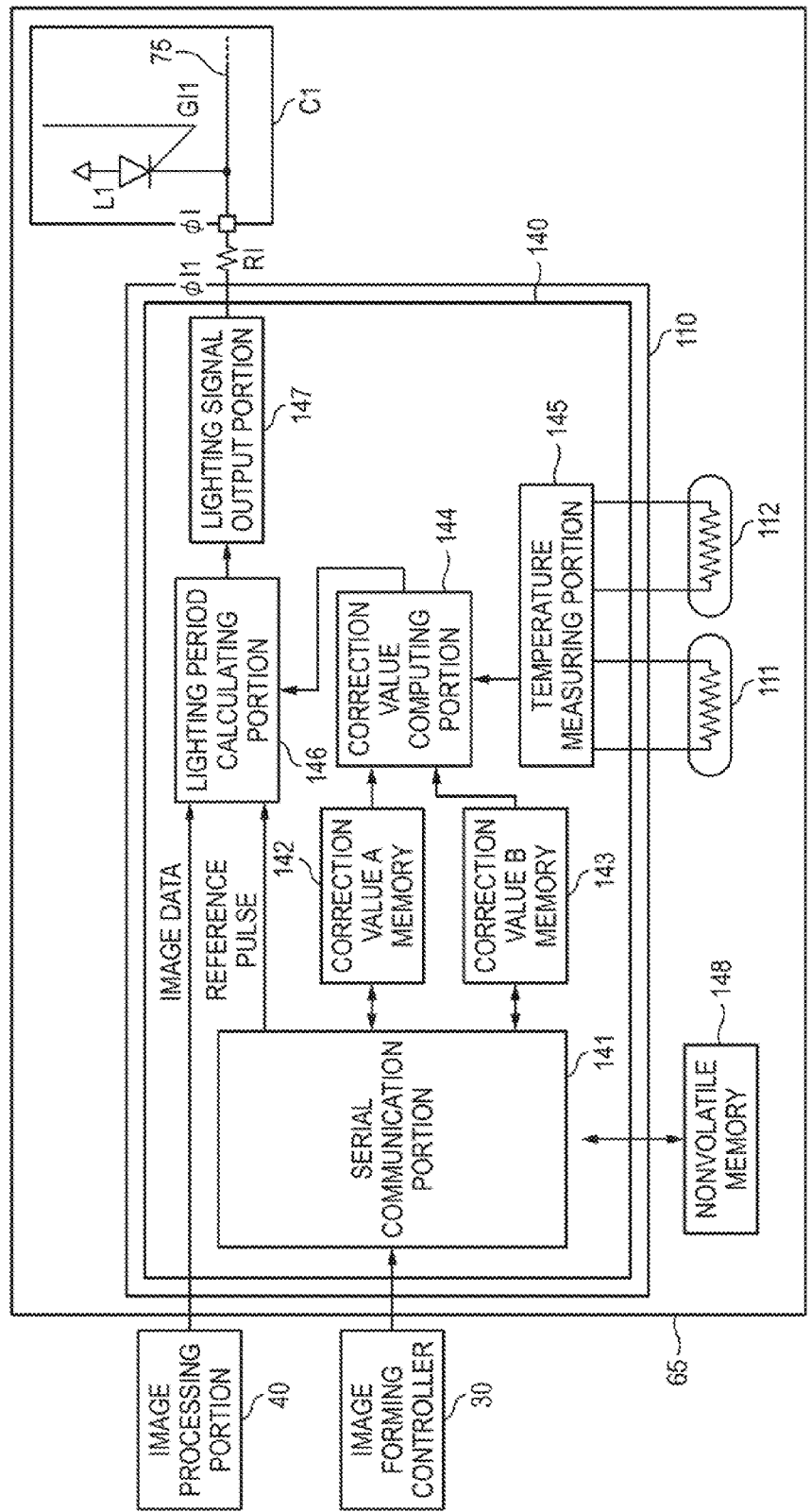
FIG. 8 is a diagram for explaining the configuration of a lighting signal generating portion in the drive circuit.

FIG. 8 is a diagram for explaining the configuration of the lighting signal generating portion 140 in the drive circuit 110.

The lighting signal generating portion 140 in the drive circuit 110 is connected to the image forming controller 30, the image processing portion 40, and the light emitting chips C. Here, assume that the lighting signal generating portion 140 is connected to the light emitting chip C1 (see FIG. 4B). Accordingly, a lighting signal output portion 147 of the lighting signal generating portion 140, which will be described later, outputs a lighting signal φI1. Incidentally, in the configuration of the light emitting device 65 shown in FIG. 4B, at least the lighting signal output portions 147 are provided in parallel for the light emitting chips C respectively.

A serial communication portion 141, a correction value A memory 142, a correction value B memory 143, a correction value computing portion 144, a temperature measuring portion 145, a lighting period calculating portion 146, and the lighting signal output portions 147 are provided.

Here, though not shown in FIGS. 3A and 3B, a nonvolatile memory 148 connected to the drive circuit 110 is provided on the mounting board 62.

The serial communication portion 141 is connected to the image forming controller 30, the correction value A memory 142, the correction value B memory 143, and the nonvolatile memory 148 so as to make communication of serial data therebetween. In addition, the serial communication portion 141 is connected to the lighting period calculating portion 146 so as to transmit a reference pulse from the image forming controller 30 to the lighting period calculating portion 146. The reference pulse serves for setting a lighting period.

The correction value A memory 142 stores a correction value A for correcting the emission amount of each light emitting thyristor L of the light source portion 63 on the assumption that the light source portion 63 is in an environment of reference temperature (for example, 25° C.).

The correction value B memory 143 stores a correction value B for a change in temperature. Here, assume that the correction value A memory 142 and the correction value B memory 143 are memories built in the drive circuit 110, and the memories are volatile memories for storing the correction values A and B when power is supplied.

The nonvolatile memory 148 stores the correction values A and B to be stored in the correction value A memory 142 and the correction value B memory 143. The nonvolatile memory 148 is, for example, an EEPROM (Electrically Erasable Programmable Read-Only Memory) or a flash memory.

Incidentally, the correction value A is an example of a first correction value, and the correction value B is an example of a second correction value. The nonvolatile memory 148 is an example of a nonvolatile memory.

Accordingly, for example, when main power is applied to the image forming apparatus 1, the image forming controller 30 gives an instruction to the serial communication portion 141 to transfer (write) the correction value A from the nonvolatile memory 148 to the correction value A memory 142 and the correction value B from the nonvolatile memory 148 to the correction value B memory 143.

Incidentally, the correction value A memory 142 and the correction value B memory 143 may be nonvolatile memories. In this case, the nonvolatile memory 148 does not have to be used.

Incidentally, the correction value A in the environment of reference temperature (for example, 25° C.) to be stored in the correction value A memory 142 can be obtained from the emission amount of the light source portion 63 measured when the print head 14 was shipped from a factory. Here, the correction value A is set for each light emitting thyristor L or for each set of consecutive plural light emitting thyristors L. For example, the correction value A is set for each set of two or four light emitting thyristors L. This is because there is a small difference in emission amount between light emitting thyristors L adjacent to each other. When the correction value is set for each set of plural light emitting thyristors L, the data quantity of correction values can be reduced, and the calculation time of a lighting period in the lighting period calculating portion 146 can be shortened.

At the time of shipment of the print head 14 from a factory, correction values A obtained thus is stored into the nonvolatile memory 148 through the serial communication portion 141 from a measuring apparatus measuring the emission amount of the light source portion 63. That is, the correction values A are set for each print head 14.

The correction value B depends on the configuration of the light emitting device 65 in the print head 14, for example, the material and shape of the mounting board 62, the position where the drive circuit 110 is mounted, etc. Therefore, when the configuration of the light emitting device 65 is determined, the correction value B is set uniquely. Here, the correction value B is a correction value in the case of a maximum temperature difference (for example, 30° C.) from the reference temperature.

The correction value B is also stored into the nonvolatile memory 148 from a measuring apparatus through the serial communication portion 141 at the time of shipment of the light emitting device 65 from a factory.

The temperature measuring portion 145 is connected to the thermistors 111 and 112 and also connected to the correction value computing portion 144. The temperature measuring portion 145 measures the temperature of the mounting board 62 using the thermistors 111 and 112.

Incidentally, each thermistor 111, 112 is provided just behind the light source portion 63 in the mounting board 62. Accordingly, the temperature of the mounting board 62 measured by the thermistor 111, 112 is correlated with the temperatures of the light emitting thyristors L of the light source portion 63. Therefore, it can be considered that the temperature measuring portion 145 measures the temperature of the light emitting thyristor L disposed just behind the thermistor 111, 112.

The correction value computing portion 144 is connected to the correction value A memory 142, the correction value B memory 143 and the temperature measuring portion 145. The correction value computing portion 144 receives the temperatures measured by the thermistors 111 and 112 respectively, and calculates the temperatures of the light emitting thyristors L in the light source portion 63. Incidentally, the correction value computing portion 144 calculates the temperature of each light emitting thyristor L when the correction value A is set for each light emitting thyristor L as described previously. On the other hand, the correction value computing portion 144 calculates the temperature of each set of plural light emitting thyristors L when the correction value A is set for each set of plural light emitting thyristors L.

Correction values to be applied are computed based on the calculated temperatures of the light emitting thyristors L. The computing of the correction values will be described later.

The lighting period calculating portion 146 is connected to the image processing portion 40, the serial communication portion 141, the correction value computing portion 144, and the lighting signal output portion 147.

The lighting period calculating portion 146 calculates each lighting period based on the reference pulse transmitted from the image forming controller 30 through the serial communication portion 141, the correction values computed by the correction value computing portion 144, and image data received from the image processing portion 40. Incidentally, the reference pulse may be set as a lighting period without correction, or may be a clock.

The lighting signal output portion 147 outputs each lighting signal φI (the lighting signal φI1 in FIG. 8) including a lighting period calculated thus. When the reference pulse is a lighting period without correction, the lighting signal output portion 147 corrects the width of the reference pulse in accordance with the lighting period, and outputs the lighting signal φI (the lighting signal φI1 in FIG. 8).

On the other hand, when the reference pulse is a clock CLK, the lighting signal output portion 147 outputs the lighting signal φI (the lighting signal φI1 in FIG. 8) based on the number of clocks CLK corresponding to the lighting period.

Figure 9:
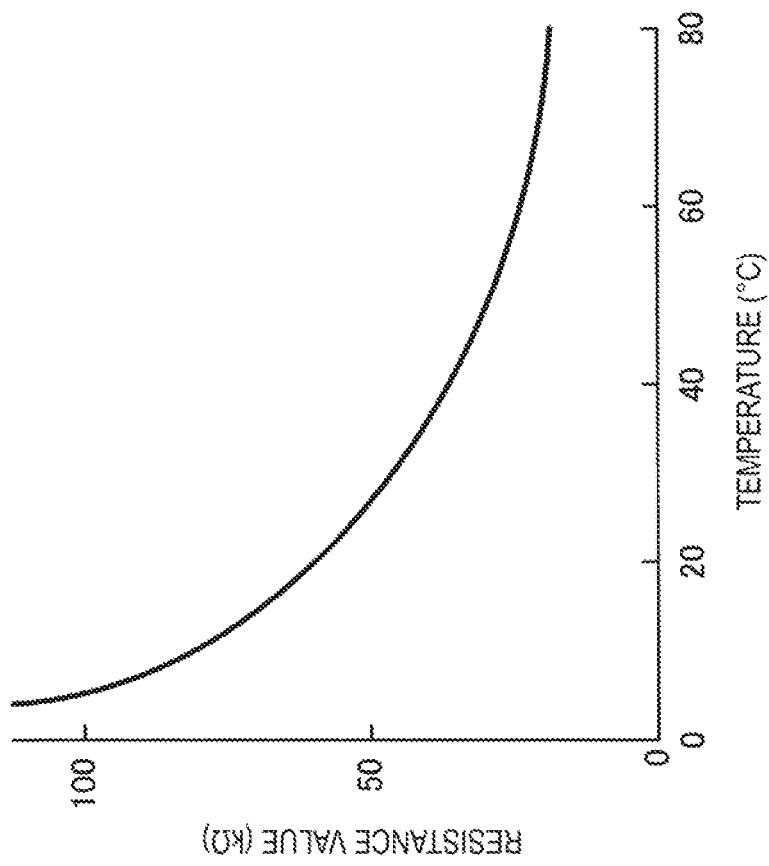
FIG. 9 is a graph for explaining the relationship between the resistance value of a thermistor and the temperature.

FIG. 9 is a graph for explaining the relationship between the resistance value of each thermistor 111, 112 and the temperature. In FIG. 9, the ordinate designates the resistance value (kΩ), and the abscissa designates the temperature (° C.).

The resistance value of each thermistor 111, 112 which is an NTC thermistor changes logarithmically with increase in temperature. Therefore, in the exemplary embodiment, a resistance value ratio is obtained from the thermistor 111, 112 and a resistor serving as a reference so that the change with respect to the temperature can be moderated to improve accuracy in temperature detection.

Figures 10A, 10B:
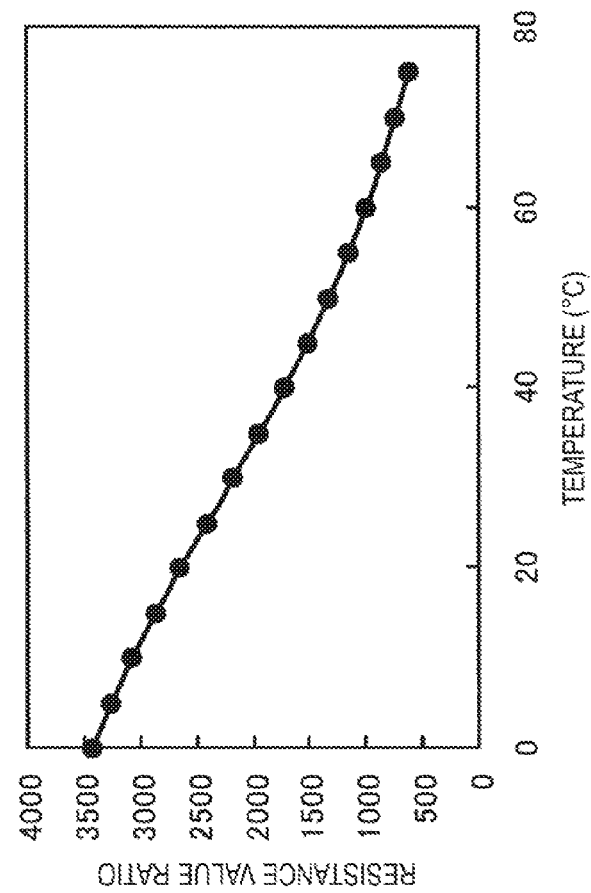
FIGS. 10A and 10B are graphs showing the relationship between the ratio (resistance value ratio) between the resistance value of a reference resistor and the resistance value of a thermistor, and the temperature.

FIGS. 10A and 10B are graphs showing an example of the relationship between the ratio (resistance value ratio) between the resistance value of the reference resistor and the resistance value of the thermistor 111, 112, and the temperature. FIG. 10A shows the relationship between the resistance value ratio and the temperature, and FIG. 10B shows a look-up table (LUT) stored as correction values B in the correction value B memory 143.

As shown in FIG. 10A, the resistance value ratio has a gentle change with respect to the temperature.

The resistance value ratios stored in the LUT shown in FIG. 10B are values designated by the marks "•" in FIG. 10A. The resistance value ratios are stored in areas designated toy addresses in the correction value B memory 143. Incidentally, when a resistance value ratio is not shown in the LUT, a temperature can be obtained by linear interpolation from the values shown in the LUT.

The correction value computing portion 144 computes a correction value to be applied (an actual correction value) based on Expression (1):

actual correction value=(correction value *B*−correction value *A*)×(measured temperature difference)/(maximum temperature difference)+correction value *A*

Here, the measured temperature difference is a difference between the reference temperature and the temperature computed by the correction value computed portion 144.

Incidentally, the maximum temperature difference is a temperature difference with respect to the correction value B as described previously.

Figure 11:
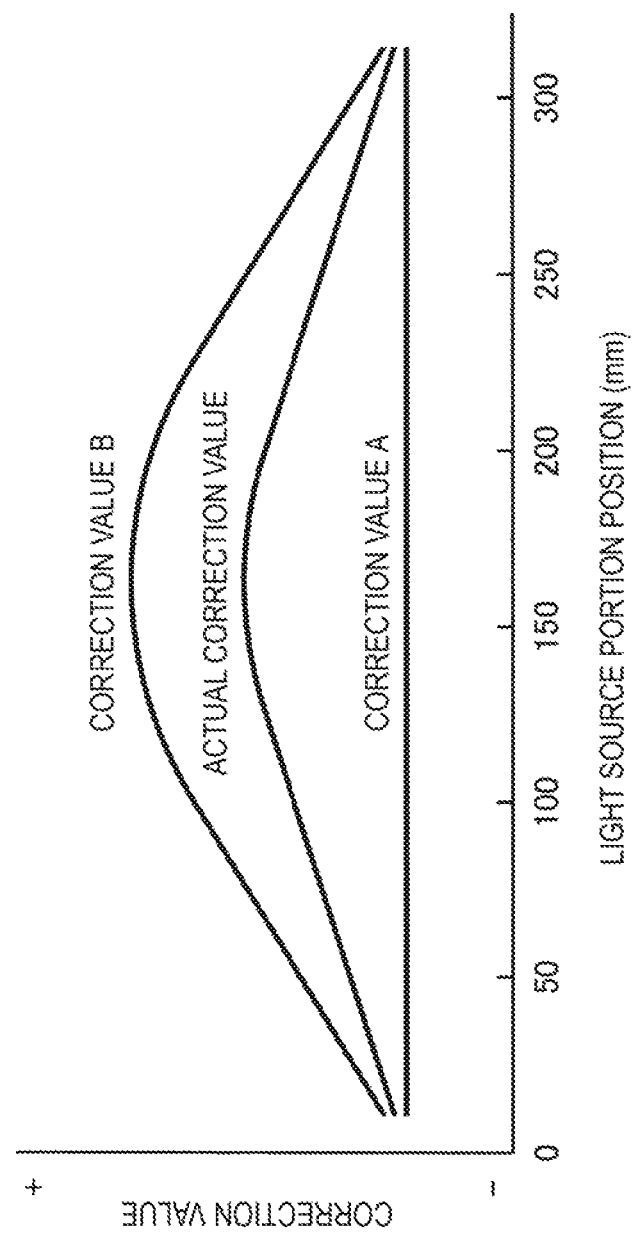
FIG. 11 is a graph showing the relationship among a correction value A, a correction value B, and an actual correction value.

FIG. 11 is a graph showing the relationship among the correction value A, the correction value B, and the actual correction value. Here, assume that the drive circuit 110 is disposed in the central portion of the array of the light emitting chips C in the mounting board 62 as shown in FIGS. 3A and 3B.

The actual correction value is set between the correction value A and the correction value B as shown by Expression (1). The actual correction value has a maximum in the central portion of the mounting board 62.

Therefore, when such an actual correction value is applied, the fluctuation in emission amount shown in FIG. 7 can be suppressed.

In the exemplary embodiment, the temperature is always measured by the temperature measuring portion 145 so that the emission amount can be corrected for each image data. As a result, the difference in emission amount can be kept lower than 0.5%. Thus, fluctuation in density cannot be visually recognized easily in an image formed on the recording paper 25.

Incidentally, in the exemplary embodiment, the two thermistors 111 and 112 are mounted on the mounting board 62. One thermistor 111 is disposed near the drive circuit 110, and the other thermistor 112 is disposed at a distant place from the drive circuit 110. That is, the thermistor 112 (second temperature detector) is provided in a farther position from the drive circuit 110 than the thermistor 111 (first temperature detector).

When the two thermistors 111 and 112 are used thus, it is preferable that one is disposed in a part where the temperature is highest, and the other is disposed in a part where the temperature is lowest. That is, the accuracy in calculating the temperature of each light emitting thyristor L in the light source portion 63 can be improved as the temperature is larger.

In addition, three or more thermistors (temperature detectors) may be mounted for measuring temperatures on the mounting board 62. Also in this case, if is preferable that the thermistors are disposed to secure larger temperature differences among the thermistors. In this manner, the temperature distribution in the mounting board 62 (light source portion 63) can be computed more accurately. For example, when plural drive circuits 110 are provided on the mounting board 62, heat is generated in plural parts corresponding to the plural drive circuits 110. It is therefore preferable that plural thermistors (temperature detectors) are provided correspondingly to the drive circuits 110 respectively so that the temperature distribution in the mounting board 62 (light emitting elements) can be computed accurately.

Incidentally, the light emitting device 65 can be arranged not to mount any drive circuit 110 on the mounting board 62 mounted with the light source portion 63. However, when the drive circuit 110 is provided outside the light emitting device 65, it is necessary to prepare another board (mounting board) to be mounted with the drive circuit 110, a cable (harness) for connecting the light emitting device 65 with the board mounted with the drive circuit 110, etc.

However, when the drive circuit 110 is mounted on the mounting board 62 mounted with the light source portion 62 of the light emitting device 65 as in the exemplary embodiment, it is not necessary to prepare the board to be mounted with the drive circuit 110, or the cable (harness). Thus, it is possible to reduce the size and cost of the image forming apparatus 1.

The exemplary embodiment has been described on the assumption that the thyristors (the transfer thyristors T and the light emitting thyristors L) are of an anode common type, that is, their anode terminals are connected to the substrate 80. However, when the polarity of the circuit is changed, the thyristors may be of a cathode common type, that is, their cathode terminals may be connected to the substrate 80.

Further, the exemplary embodiment has been described along a self-scanning light emitting element array (SLED) constituted by the light emitting thyristors L and the transfer thyristors T. However, other members such as control thyristors, diodes, resistors, etc. may be included in addition to the light emitting thyristors L and the transfer thyristors T.

In addition, in the exemplary embodiment, the transfer thyristors T are connected to one another through the coupling diodes Dx. However, other members such as resistors which can transmit a change in potential may be used.

Although the lighting signal φI is supplied for each light emitting chip C in the light emitting device 65, plural light emitting chips C may be arranged so that the lighting signal φI can be supplied to the light emitting chips C in common.

Although the light emitting elements are light emitting thyristors in the exemplary embodiment, the light emitting elements may be light emitting diodes (LED) in which a p-type semiconductor layer and an n-type semiconductor layer have been laminated.

What is claimed is:

1. A print head comprising:
   a mounting board;
   a light source portion that comprises a plurality of light emitting elements provided on one surface of the mounting board;
   a drive member that is provided on other surface of the mounting board so as to generate a lighting signal and drive the light source portion; and
   a first temperature detector that is provided on the mounting board, and at least one second temperature detector that is provided at a farther position on the mounting board from the drive member than the first temperature detector;
   wherein the drive member comprises:
   a light emitting unit that generates the lighting signal based on a temperature detected by the first temperature detector and a temperature detected by the second temperature detector; and
   an optical unit that forms an image of light emitted from the light emitting unit.

2. The print head according to claim 1, wherein the drive member generates the lighting signal using a first correction value that can correct each emission amount among the plurality of light emitting elements at a predetermined temperature, and a second correction value that can correct a change in emission amount caused by temperature.

3. The print head according to claim 2, wherein the first temperature detector and the second temperature detector are provided on the other surface of the mounting board and just behind the light source portion provided on the one surface of the mounting board.

4. The print head according to claim 3, wherein the drive member provided on the other surface of the mounting board is provided on the other surface of the mounting board corresponding to a longitudinally central portion of the light source portion provided on the one surface of the mounting board.

5. The print head according to claim 2, wherein the drive member provided on the other surface of the mounting board is provided on the other surface of the mounting board corresponding to a longitudinally central portion of the light source portion provided on the one surface of the mounting board.

6. The print head according to claim 2, wherein the light emitting unit comprises a nonvolatile memory that can store the first correction value and the second correction value.

7. The print head according to claim 1, wherein the first temperature detector and the second temperature detector are provided on the other surface of the mounting board and just behind the light source portion provided on the one surface of the mounting board.

8. The print head according to claim 7, wherein the drive member provided on the other surface of the mounting board is provided on the other surface of the mounting board corresponding to a longitudinally central portion of the light source portion provided on the one surface of the mounting board.

9. The print head according to claim 1, wherein the drive member provided on the other surface of the mounting board is provided on the other surface of the mounting board corresponding to a longitudinally central portion of the light source portion provided on the one surface of the mounting board.

10. An image forming apparatus comprising:
    an image holder;
    a charging unit that charges the image holder;
    a light emitting device that comprises a mounting board, a light source portion that comprises a plurality of light emitting elements provided on one surface of the mounting board, a drive member that is provided on other surface of the mounting board so as to generate a lighting signal and drive the light source portion, a first temperature detector that is provided on the mounting board, and at least one second temperature detector that is provided at a farther position on the mounting board from the drive member than the first temperature detector, the drive member comprising a light emitting unit that generates the lighting signal based on a temperature detected by the first temperature detector and a temperature detected by the second temperature detector;
    an exposure unit by which the image holder charged by the charging unit is exposed to light emitted from the light emitting device through an optical unit;
    a developing unit that develops an electrostatic latent image formed on the image holder exposed by the exposure unit; and
    a transfer unit by which an image developed on the image holder is transferred onto a body to be transferred.

* * * * *